US012627603B2

(12) United States Patent
Geng et al.

(10) Patent No.: US 12,627,603 B2
(45) Date of Patent: May 12, 2026

(54) PACKET TRANSMISSION METHOD, APPARATUS, DEVICE, AND SYSTEM, AND STORAGE MEDIUM

(71) Applicant: HUAWEI TECHNOLOGIES CO., LTD., Shenzhen (CN)

(72) Inventors: Xuesong Geng, Beijing (CN); Zhenbin Li, Beijing (CN); Jingrong Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 426 days.

(21) Appl. No.: 18/338,194

(22) Filed: Jun. 20, 2023

(65) Prior Publication Data

US 2023/0336478 A1      Oct. 19, 2023

Related U.S. Application Data

(63) Continuation of application No. PCT/CN2021/118863, filed on Sep. 16, 2021.

(30) Foreign Application Priority Data

Dec. 22, 2020 (CN) .......................... 202011528118.3
Feb. 27, 2021 (CN) .......................... 202110221894.7

(51) Int. Cl.
H04L 12/00 (2006.01)
H04L 45/00 (2022.01)
H04L 45/74 (2022.01)

(52) U.S. Cl.
CPC .............. *H04L 45/74* (2013.01); *H04L 45/34* (2013.01)

(58) Field of Classification Search
CPC ......... H04L 45/74; H04L 45/34; H04L 69/22; H04L 45/50; H04L 69/325; H04L 45/16
(Continued)

(56) References Cited

U.S. PATENT DOCUMENTS 12,231,329 B2 * 2/2025 Li .......................... H04L 69/325
2020/0119991 A1 4/2020 Dutta
(Continued)

FOREIGN PATENT DOCUMENTS

EP 3534579 B1 * 4/2022 ............. G06F 9/544
EP 4561013 A2 * 5/2025 ............. H04L 69/22
(Continued)

OTHER PUBLICATIONS

H. Chen et al:"SRv6 Point-to-Multipoint Path draft-chen-pim-srv6-p2mp-path-01."Sep. 28, 2020, total 11 pages.
(Continued)

*Primary Examiner* — Frantz Coby
(74) *Attorney, Agent, or Firm* — WOMBLE BOND DICKINSON (US) LLP

(57) ABSTRACT

A packet transmission method, apparatus, device, and system, and a storage medium are provided. The method includes: A first device obtains a first packet, and determines node information of a second device and node information of a third device from a node information list of the first packet by using a first part included in a destination address field of the first packet. The first device generates, based on the first packet, a second packet including the node information of the second device and a third packet including the node information of the third device. The first device sends the second packet to the second device, and sends the third packet to the third device.

20 Claims, 14 Drawing Sheets

(58) Field of Classification Search
    USPC .......................................................... 370/392
    See application file for complete search history.

(56) References Cited

U.S. PATENT DOCUMENTS

| | | | | |
|---|---|---|---|---|
| 2021/0243111 A1 * | 8/2021 | Dutta | ...................... | H04L 45/24 |
| 2022/0052939 A1 * | 2/2022 | Dutta | ...................... | H04L 45/64 |

FOREIGN PATENT DOCUMENTS

| | | | | | |
|---|---|---|---|---|---|
| JP | 2000354063 | A | 12/2000 | | |
| JP | 2007221521 | A | 8/2007 | | |
| JP | 2020535712 | A | 12/2020 | | |
| WO | WO-2019128950 | A1 * | 7/2019 | ............. | H04L 45/50 |

OTHER PUBLICATIONS

Yimin Shen et al:"Point-to-Multipoint Transport Using Chain Replication in Segment Routing",draft-shen-spring-p2mp-transport-chain-02, Apr. 1, 2020, total 11 pages.

H. Chen et al:"SRv6 Point-to-Multipoint Path", draft-chen-pim-srv6-p2mp-path-00, Jul. 12, 2020, total 13 pages.

S. Deering et al:"Internet Protocol, Version 6 (IPv6) Specification",Dec. 1998, total 39 pages.

* cited by examiner

A first device obtains a first packet, where the first packet carries a destination address field and a node information list, and the destination address field includes a first part — 201

The first device determines node information of a second device and node information of a third device from the node information list based on the first part — 202

The first device generates a second packet and a third packet based on the first packet, where the second packet includes the node information of the second device, and the third packet includes the node information of the third device — 203

The first device sends the second packet to the second device, and sends the third packet to the third device — 204

FIG. 2

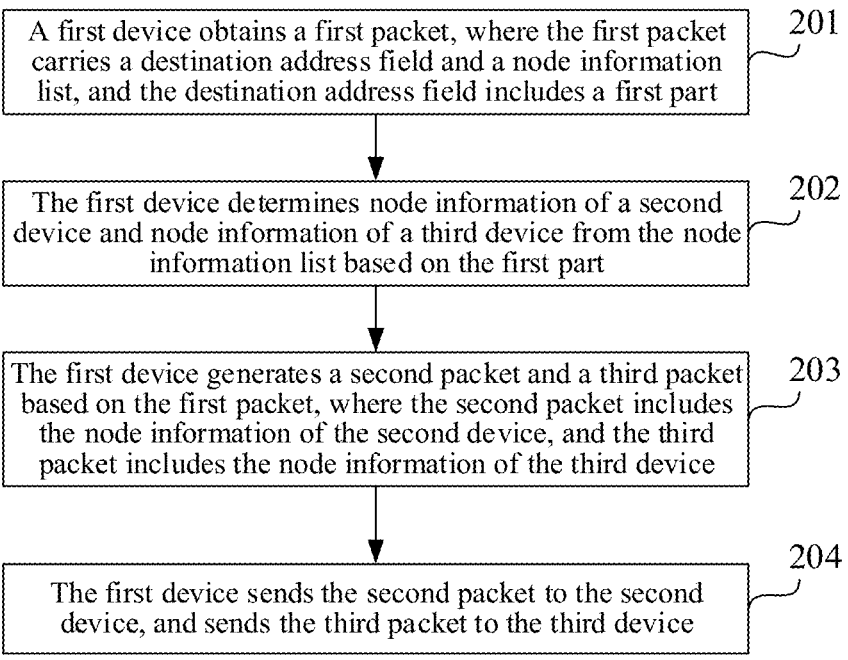

| Next header (next header) | Extension header length (ext hdr len) | Routing type (routing type) | First identifier (segment left) |
|---|---|---|---|
| Last entry (last entry) | Flag of a data packet (flags) | Tag of data packets in a same group (tag) | |
| Sequence number = 0, Node address = A, and Node pointer = 1-2 | | | |
| Sequence number = 1, Node address = B, and Node pointer = 3-5 | | | |
| Sequence number = 2, Node address = C, and Node pointer = 6-8 | | | |
| Sequence number = 3, Node address = B1, and Node pointer = 0 (null) | | | |
| ... | | | |
| Sequence number = 8, Node address = C3, and Node pointer = null | | | |

Segment list

FIG. 3

| Next header (next header) | Extension header length (ext hdr len) | Routing type (routing type) | Quantity of remaining hops (segment left) |
|---|---|---|---|
| First identifier | Reserved field | | |
| Sequence number = 0, Node address = A, and Node pointer = 1-2 | | | |
| Sequence number = 1, Node address = B, and Node pointer = 3-5 | | | |
| Sequence number = 2, Node address = C, and Node pointer = 6-8 | | | |
| Sequence number = 3, Node address = B1, and Node pointer = 0 (null) | | | |
| ... | | | |
| Sequence number = 8, Node address = C3, and Node pointer = null | | | |

Segment list

FIG. 5

| Next header (next header) | Extension header length (ext hdr len) | Option type (option type) | Option length (option length) |
|---|---|---|---|
| First identifier | Reserved field | | |
| Sequence number = 0, Node address = A, and Node pointer = 1-2 | | | |
| Sequence number = 1, Node address = B, and Node pointer = 3-5 | | | |
| Sequence number = 2, Node address = C, and Node pointer = 6-8 | | | |
| Sequence number = 3, Node address = B1, and Node pointer = null | | | |
| ... | | | |
| Sequence number = 8, Node address = C3, and Node pointer = null | | | |

Address list

FIG. 6

|  | Node address (locator) | Node pointer (pointer) | Sequence of node information of devices (SL) |
|---|---|---|---|
| Layer (layer) 1 | A | SL = 1-2 | 0 |
| Layer 2 | B | SL = 3-5 | 1 |
|  | C | SL = 6-8 | 2 |
| Layer 3 | B1 | 0 | 3 |
|  | B2 | 0 | 4 |
|  | B3 | 0 | 5 |
|  | C1 | 0 | 6 |
|  | C2 | 0 | 7 |
|  | C3 | 0 | 8 |

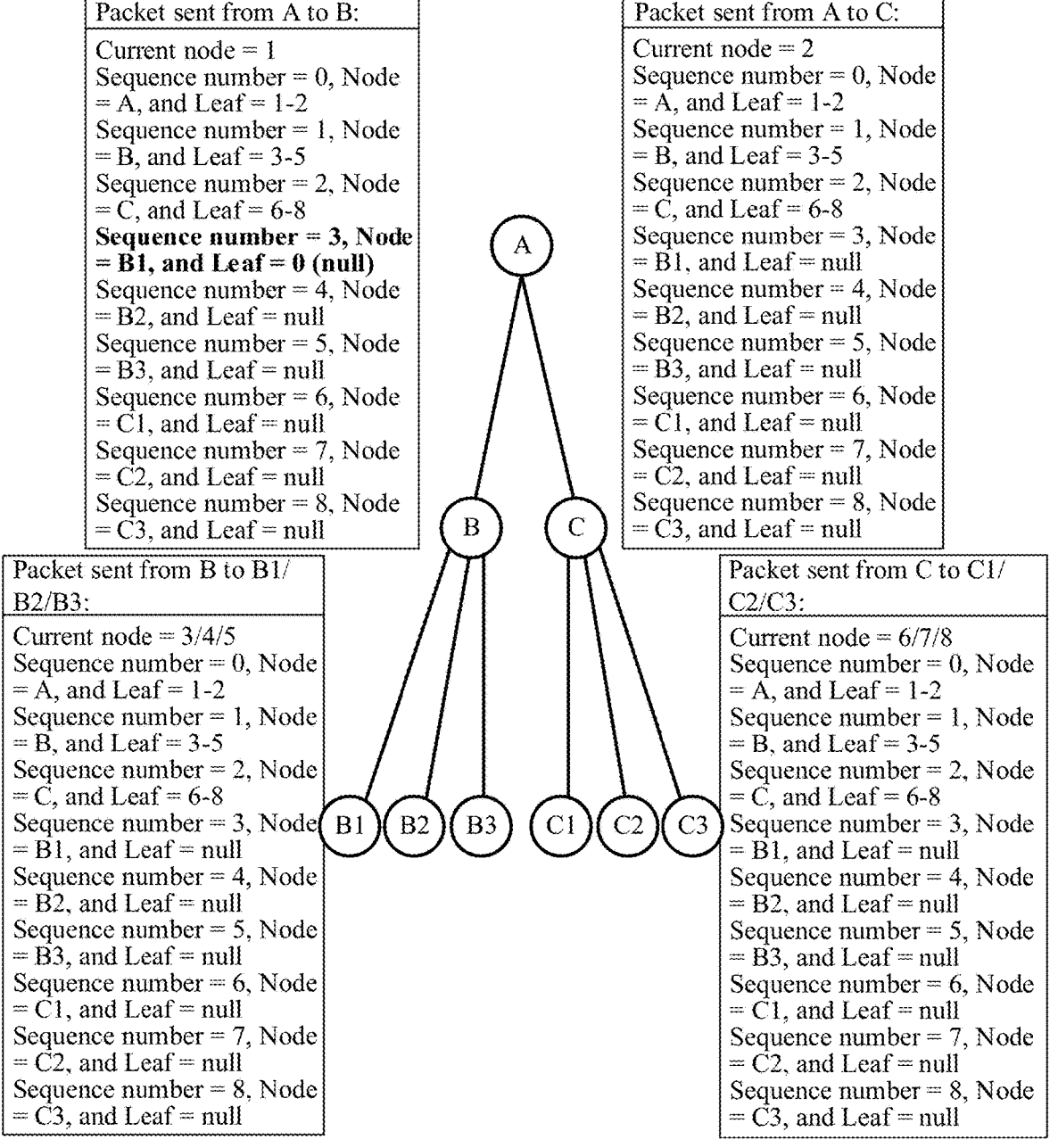

Packet sent from A to B:

Current node = 1
Sequence number = 0, Node = A, and Leaf = 1-2
Sequence number = 1, Node = B, and Leaf = 3-5
Sequence number = 2, Node = C, and Leaf = 6-8
Sequence number = 3, Node = B1, and Leaf = 0 (null)
Sequence number = 4, Node = B2, and Leaf = null
Sequence number = 5, Node = B3, and Leaf = null
Sequence number = 6, Node = C1, and Leaf = null
Sequence number = 7, Node = C2, and Leaf = null
Sequence number = 8, Node = C3, and Leaf = null Packet sent from A to C:

Current node = 2
Sequence number = 0, Node = A, and Leaf = 1-2
Sequence number = 1, Node = B, and Leaf = 3-5
Sequence number = 2, Node = C, and Leaf = 6-8
Sequence number = 3, Node = B1, and Leaf = null
Sequence number = 4, Node = B2, and Leaf = null
Sequence number = 5, Node = B3, and Leaf = null
Sequence number = 6, Node = C1, and Leaf = null
Sequence number = 7, Node = C2, and Leaf = null
Sequence number = 8, Node = C3, and Leaf = null Packet sent from B to B1/B2/B3:

Current node = 3/4/5
Sequence number = 0, Node = A, and Leaf = 1-2
Sequence number = 1, Node = B, and Leaf = 3-5
Sequence number = 2, Node = C, and Leaf = 6-8
Sequence number = 3, Node = B1, and Leaf = null
Sequence number = 4, Node = B2, and Leaf = null
Sequence number = 5, Node = B3, and Leaf = null
Sequence number = 6, Node = C1, and Leaf = null
Sequence number = 7, Node = C2, and Leaf = null
Sequence number = 8, Node = C3, and Leaf = null Packet sent from C to C1/C2/C3:

Current node = 6/7/8
Sequence number = 0, Node = A, and Leaf = 1-2
Sequence number = 1, Node = B, and Leaf = 3-5
Sequence number = 2, Node = C, and Leaf = 6-8
Sequence number = 3, Node = B1, and Leaf = null
Sequence number = 4, Node = B2, and Leaf = null
Sequence number = 5, Node = B3, and Leaf = null
Sequence number = 6, Node = C1, and Leaf = null
Sequence number = 7, Node = C2, and Leaf = null
Sequence number = 8, Node = C3, and Leaf = null

FIG. 9

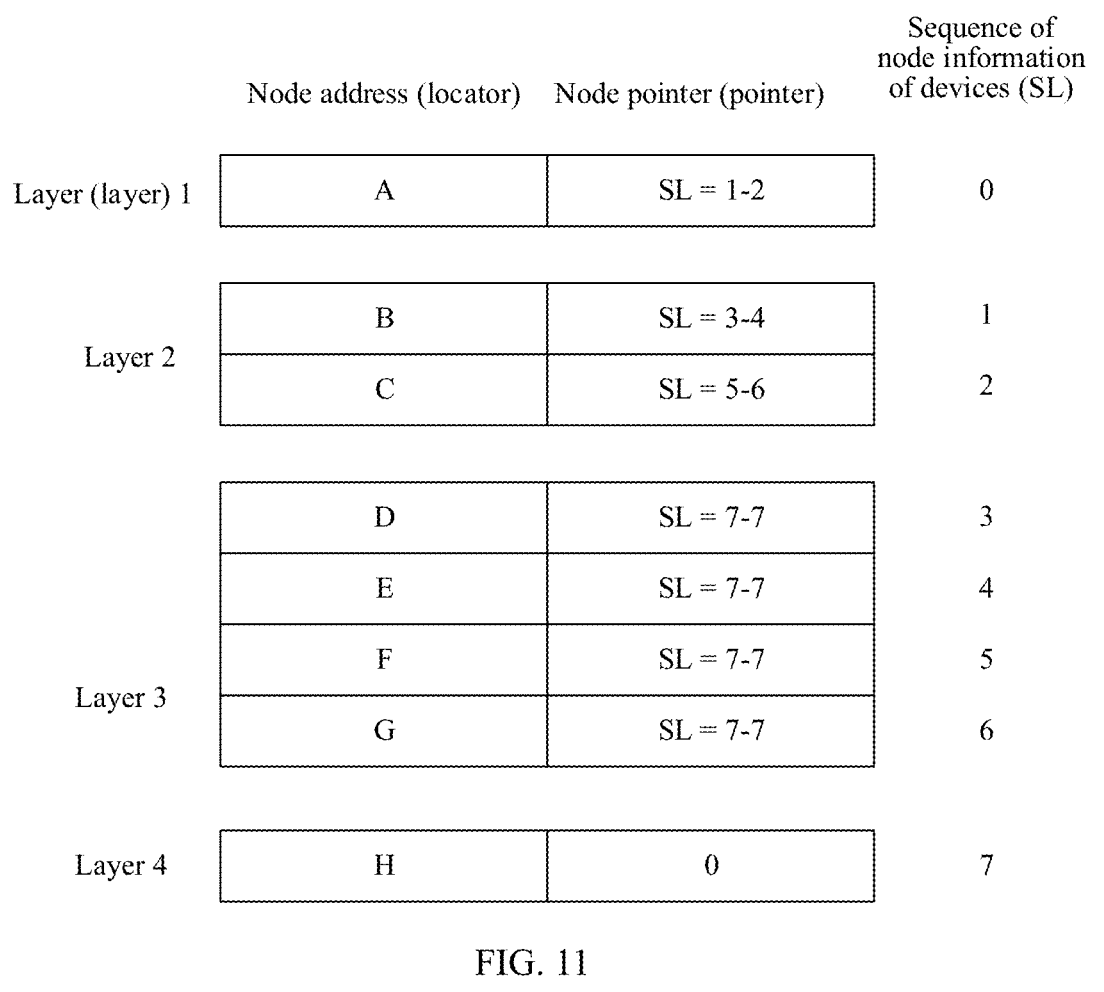

| | Node address (locator) | Node pointer (pointer) | Sequence of node information of devices (SL) |
|---|---|---|---|
| Layer (layer) 1 | A | SL = 1-2 | 0 |
| Layer 2 | B | SL = 3-4 | 1 |
| | C | SL = 5-6 | 2 |
| Layer 3 | D | SL = 7-7 | 3 |
| | E | SL = 7-7 | 4 |
| | F | SL = 7-7 | 5 |
| | G | SL = 7-7 | 6 |
| Layer 4 | H | 0 | 7 |

FIG. 11

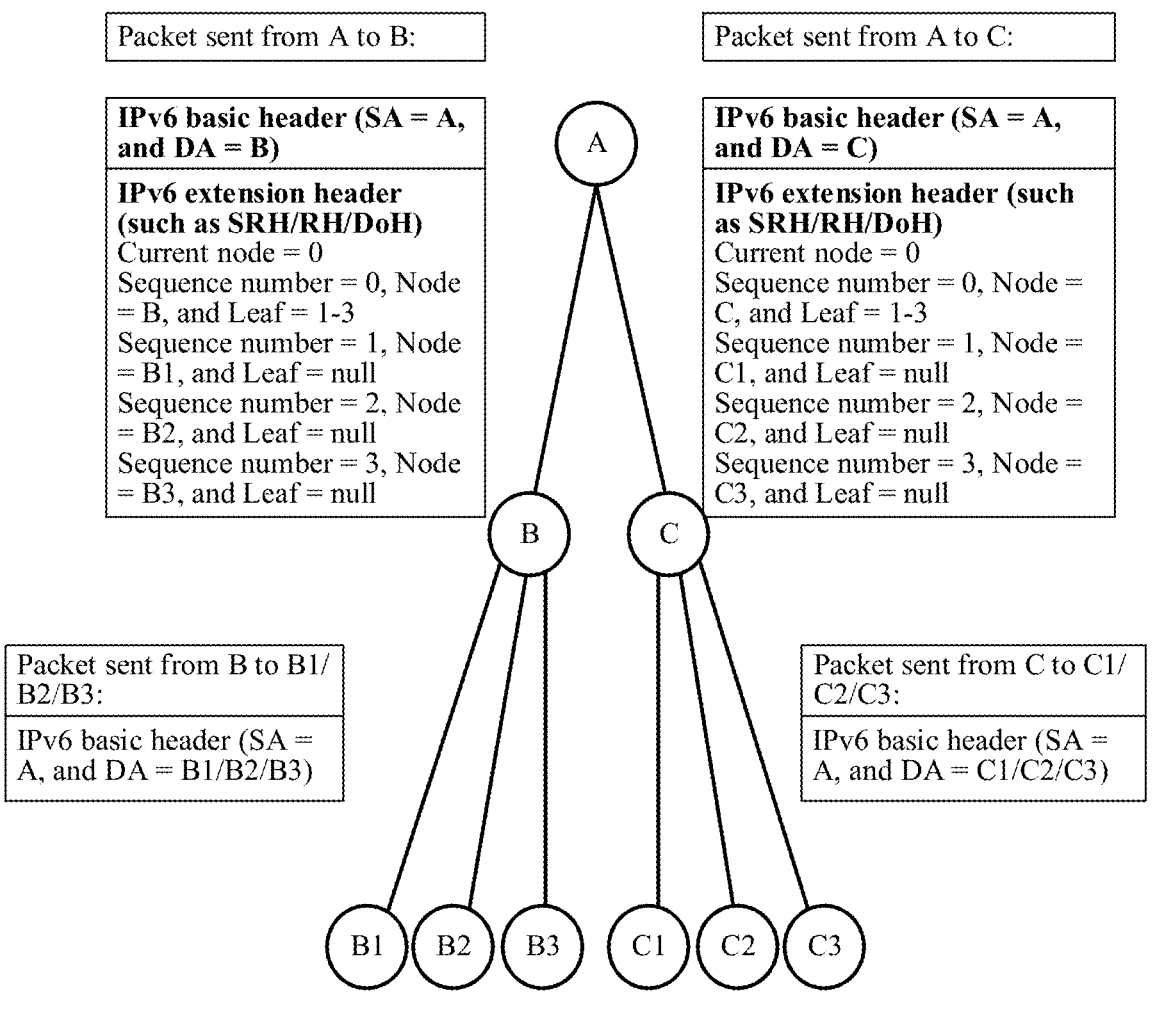

Packet sent from A to B:

IPv6 basic header (SA = A, and DA = B)

IPv6 extension header (such as SRH/RH/DoH)
Current node = 0
Sequence number = 0, Node = B, and Leaf = 1-3
Sequence number = 1, Node = B1, and Leaf = null
Sequence number = 2, Node = B2, and Leaf = null
Sequence number = 3, Node = B3, and Leaf = null Packet sent from A to C:

IPv6 basic header (SA = A, and DA = C)

IPv6 extension header (such as SRH/RH/DoH)
Current node = 0
Sequence number = 0, Node = C, and Leaf = 1-3
Sequence number = 1, Node = C1, and Leaf = null
Sequence number = 2, Node = C2, and Leaf = null
Sequence number = 3, Node = C3, and Leaf = null Packet sent from B to B1/B2/B3:

IPv6 basic header (SA = A, and DA = B1/B2/B3)

Packet sent from C to C1/C2/C3:

IPv6 basic header (SA = A, and DA = C1/C2/C3)

FIG. 13

IPv6 header (SA = A, and DA = 2001:db8:3:4:5:6:B0:FE35)

IPv6 extension header (first identifier = 1)
A0:FE12
B0:FE35
C0:FE68
B1:FE00
B2:FE00
B3:FE00
C1:FE00
C2:FE00
C3:FE00

FIG. 14

| IPv6 header (SA = A, and DA = 2001:db8:3:4:5:6:B0:FE35) |
| --- |
| IPv6 extension header (first identifier = 1)<br>           A0:FE12<br>           B0:FF35<br>           C0:FE68<br>           B1:FF00<br>           B2:FF00<br>           B3:FF00<br>           C1:FF00<br>           C2:FF00<br>           C3:FF00 |

FIG. 15

| IPv6 header (SA = A, and DA = 2001:db8:3:4:5:6:B0:0135) |
| --- |
| IPv6 extension header (first identifier = 1)<br>           A0:0012<br>           B0:0035<br>           C0:0068<br>           B1:0100<br>           B2:0100<br>           B3:0100<br>           C1:0100<br>           C2:0100<br>           C3:0100 |

PACKET TRANSMISSION METHOD, APPARATUS, DEVICE, AND SYSTEM, AND STORAGE MEDIUM

CROSS-REFERENCE TO RELATED APPLICATIONS

This application is a continuation of International Application No. PCT/CN2021/118863, filed on Sep. 16, 2021, which claims priorities to Chinese Patent Application No. 202011528118.3, filed on Dec. 22, 2020, and Chinese Patent Application No. 202110221894.7, filed on Feb. 27, 2021. All of the aforementioned patent applications are hereby incorporated by reference in their entirety.

TECHNICAL FIELD

This application relates to the field of communication technologies, and in particular, to a packet transmission method, apparatus, device, and system, and a storage medium.

BACKGROUND

In a communication network, a communication device transmits information by transmitting a packet. With development of communication technologies, there are an increasing quantity of manners of transmitting a packet between communication devices. For example, a packet is transmitted in a segment routing over internet protocol version 6 (SRv6) scenario. For an SRv6 packet, a segment routing extension header (SRH) is inserted into an IPv6 packet, and the SRv6 packet is transmitted on a packet transmission path by using a segment list. For example, in a multicast technology, a segment identifier (SID) of the SRH is extended, and a quantity of forks of a multicast tree and a quantity of sub-tree segment identifiers are defined, to locate a location of a SID of a next node in the segment list. In addition, after a packet is replicated, SIDs of other nodes and sub-tree SIDs of other nodes are removed, to transmit the packet on the packet transmission path.

However, in the segment list provided in the method, a SID corresponding to a replication node and a SID corresponding to a sub-tree obtained after the replication node performs replication are arranged together for nested encoding. As a result, an encoding structure is complex, and each node needs to process a SID after replicating a packet. Consequently, overheads in a packet transmission process are excessively high, and transmission efficiency is excessively low.

SUMMARY

Embodiments of this application provide a packet transmission method, apparatus, device, and system, and a storage medium, to reduce overheads in a packet transmission process and improve transmission efficiency.

According to a first aspect, a packet transmission method is provided. An example in which a first device performs the method is used to describe the method. The first device obtains a first packet carrying a destination address field and anode information list. The node information list includes node information of a second device and node information of a third device. The second device and the third device are devices on a transmission path of the first packet, and may or may not be next-hop devices of the first device. For example, the first packet is an SRv6 packet, the node information list is a segment list, the node information of the second device is a SID of the second device, and the node information of the third device is a SID of the third device. The destination address field includes a first part, and the first part identifies locations of the node information of the second device and the node information of the third device in the node information list. Similarly, an example in which the first packet is an SRv6 packet is used. The first part may be implemented by defining a pointer in an argument (Args) field of a SID. That is, the first part is the pointer. The first device determines the node information of the second device and the node information of the third device from the node information list based on the first part, and generates a second packet and a third packet based on the first packet. The second packet includes the node information of the second device, and the third packet includes the node information of the third device. The first device sends the second packet to the second device, and sends the third packet to the third device.

According to the packet transmission method provided in the technical solution, the first device can quickly locate, by using the first part and the node information list that are carried in the first packet, a next packet processing device, generate, based on the first packet, a packet that needs to be received by the next packet processing device, and transmit the packet. This reduces overheads in a packet transmission process and improves packet transmission efficiency.

In an embodiment, the node information list may or may not include node information of the first device. When the node information list includes only node information of a packet processing device that is located after the first device on the transmission path of the first packet, space occupied by the node information list may be reduced, so that the packet transmission efficiency may also be improved.

In an embodiment, the first part indicates that a location of the node information of the second device in the node information list is a start location, and a location of the node information of the third device in the node information list is an end location. Alternatively, the first part indicates that a location of the node information of the second device in the node information list is a start location and indicates an offset of a location of the third device in the node information list relative to a location of the second device in the node information list. A manner in which the first part identifies the locations of the node information of the second device and the node information of the third device in the node information list is flexible. The first part and information indicated by the node information list are used, so that the first device can obtain a quantity of next packet processing devices and a location of the next packet processing device.

In an embodiment, that the first device generates a second packet based on the first packet includes: The first device replicates the first packet based on the first part to obtain a fourth packet. The first device adds the node information of the second device to the fourth packet to obtain the second packet. Therefore, the second packet carries the node information of the second device, and can indicate the second device to receive and process the packet.

In an embodiment, the first device is an ingress node on a transmission path of the first packet. That the first device obtains a first packet includes: The first device receives a fifth packet, and adds the first part and a second part to a destination address field of the fifth packet, to obtain the first packet. The second part identifies an address of the first device. The second part identifies the address of the first device, so that the first device can be indicated to process the first packet.

In an embodiment, the first device is an intermediate node on a transmission path of the first packet. The destination address field further includes a second part, and before that the first device generates a second packet and a third packet based on the first packet, the method further includes: The first device determines that the second part matches an address of the first device. It is determined that the second part matches the address of the first device, so that the first device processes the first packet.

In an embodiment, the first packet is an SRv6 packet, the node information list is carried in a segment routing header SRH of the SRv6 packet, and the node information list is a segment list of the SRH. Alternatively, the first packet is an IPv6 packet, the node information list is carried in a routing header RH of the IPv6 packet, and the node information list is a segment list of the RH. Alternatively, the first packet is an IPv6 packet, the node information list is carried in a destination options header DOH of the IPv6 packet, and the node information list is an address list of the DOH. The method is applicable to a plurality of types of packets, so that an application scenario range of the packet transmission method provided in this application is wider.

In an embodiment, the first packet, the second packet, and the third packet each further carry a first identifier, and the first identifier indicates a location of node information of a current packet processing device in the node information list.

In an embodiment, the first packet further carries a leaf identifier, and the leaf identifier indicates that the first device is a leaf node. After that the first device obtains a first packet, the first device performs, based on the leaf identifier and the first part, a processing operation such as decapsulation on the first packet obtained through replication.

In an embodiment, the node information list carries the leaf identifier. In an embodiment, a length of the leaf identifier is at least 1 bit.

In an embodiment, the second part includes a common prefix and a node identifier, the common prefix includes a same part of node addresses in node information of packet processing devices, and the node identifier indicates a different part of the node addresses in the node information of the packet processing devices. In this way, a size of the packet is reduced, and the packet transmission efficiency is further improved.

In an embodiment, the node information list includes a segment list, and one or more segment identifiers in the segment list do not include the common prefix.

In an embodiment, when the node information list includes the segment list, a length of any one of the one or more segment identifiers in the segment list is less than 128 bits.

In an embodiment, the common prefix further includes a function identifier, and the function identifier indicates a function to be performed by the device.

According to a second aspect, a packet transmission apparatus is provided. The apparatus is applied to a first device, and the apparatus includes: an obtaining module and a sending module. The obtaining module is configured to: obtain a first packet, where the first packet carries a destination address field and a node information list, the node information list includes node information of a second device and node information of a third device, and the destination address field includes a first part; and determine the node information of the second device and the node information of the third device from node information list based on the first part, where the first part identifies locations of the node information of the second device and the node information of the third device in the node information list. The obtaining module is further configured to generate a second packet and a third packet based on the first packet, where the second packet includes the node information of the second device, and the third packet includes the node information of the third device. The sending module is configured to send the second packet to the second device, and send the third packet to the third device.

In an embodiment, the first part indicates that a location of the node information of the second device in the node information list is a start location, and a location of the node information of the third device in the node information list is an end location. Alternatively, the first part indicates that a location of the node information of the second device in the node information list is a start location and indicates an offset of a location of the third device in the node information list relative to a location of the second device in the node information list.

In an embodiment, the obtaining module is configured to replicate the first packet based on the first part to obtain a fourth packet; and add the node information of the second device to the fourth packet to obtain the second packet.

In an embodiment, the first device is an ingress node on a transmission path of the first packet. The obtaining module is configured to receive a fifth packet, and add the first part and a second part to a destination address field of the fifth packet, to obtain the first packet, where the second part identifies an address of the first device.

In an embodiment, the first device is an intermediate node on a transmission path of the first packet, the destination address field further includes a second part, and the apparatus further includes a determining module. The determining module is configured to determine, before the obtaining module is configured to generate the second packet and the third packet based on the first packet, that the second part matches an address of the first device.

In an embodiment, the first packet is an SRv6 packet, the node information list is carried in a segment routing header SRH of the SRv6 packet, and the node information list is a segment list of the SRH. Alternatively, the first packet is an IPv6 packet, the node information list is carried in a routing header RH of the IPv6 packet, and the node information list is a segment list of the RH. Alternatively, the first packet is an IPv6 packet, the node information list is carried in a destination options header DOH of the IPv6 packet, and the node information list is an address list of the DOH.

In an embodiment, the first packet, the second packet, and the third packet each further carry a first identifier, and the first identifier indicates a location of node information of a current packet processing device in the node information list.

In an embodiment, the first packet further carries a leaf identifier, and the leaf identifier indicates that the first device is a leaf node. The apparatus further includes a decapsulation module. The decapsulation module is configured to decapsulate, based on the leaf identifier and the first part and after the obtaining module obtains the first packet, a first packet obtained through replication.

In an embodiment, the node information list carries the leaf identifier. In an embodiment, a length of the leaf identifier is at least 1 bit.

In an embodiment, the second part includes a common prefix and a node identifier, the common prefix includes a same part of node addresses in node information of packet processing devices, and the node identifier indicates a different part of the node addresses in the node information of the packet processing devices.

In an embodiment, the node information list includes a segment list, and one or more segment identifiers in the segment list do not include the common prefix.

In an embodiment, a length of any one of the one or more segment identifiers is less than 128 bits.

In an embodiment, the common prefix further includes a function identifier, and the function identifier indicates a function to be performed by the device.

According to a third aspect, a packet transmission device is provided, and includes a processor. The processor is coupled to a memory, the memory stores at least one instruction, and the at least one instruction is loaded and executed by the processor, to enable the packet transmission device to implement the packet transmission method according to any one of the first aspect or the embodiments of the first aspect.

According to a fourth aspect, a computer-readable storage medium is provided. The computer-readable storage medium stores at least one instruction, and the instruction is loaded and executed by a processor, to enable a computer to implement the packet transmission method according to any one of the first aspect or the embodiments of the first aspect.

According to a fifth aspect, a computer program product is provided, and includes a computer program. When the computer program is executed by a computer, the packet transmission method according to any one of the first aspect or the embodiments of the first aspect is implemented.

According to a sixth aspect, a communication apparatus is provided. The apparatus includes: a transceiver, a memory, and a processor. The transceiver, the memory, and the processor communicate with each other by using an internal connection path. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the packet transmission method according to any one of the first aspect or the embodiments of the first aspect.

In an example embodiment, there are one or more processors, and there are one or more memories.

In an example embodiment, the memory may be integrated with the processor, or the memory and the processor are disposed separately.

In an embodiment, the memory may be a non-transitory memory, such as a read-only memory (ROM). The memory and the processor may be integrated into one chip, or may be separately disposed on different chips. A type of the memory and a manner of disposing the memory and the processor are not limited in this embodiment of this application.

According to a seventh aspect, a chip is provided, and includes a processor. The processor is configured to invoke, from a memory, the instructions stored in the memory and run the instructions, to enable a communication device on which the chip is installed performs the packet transmission method according to any one of the first aspect or the embodiments of the first aspect.

According to an eighth aspect, another chip is provided, and includes: an input interface, an output interface, a processor, and a memory. The input interface, the output interface, the processor, and the memory are connected by using an internal connection path. The processor is configured to execute code in the memory. When the code is executed, the processor is configured to perform the packet transmission method according to any one of the first aspect or the embodiments of the first aspect.

According to a ninth aspect, a packet transmission system is provided. The packet transmission system includes a first device, a second device, and a third device. The first device performs the packet transmission method according to any one of the first aspect or the embodiments of the first aspect, the second device receives a second packet sent by the first device, and the third device receives a third packet sent by the first device. In an embodiment, the second device may process the second packet in a manner in which the first device processes a first packet, and the third device may also process the third packet in a manner in which the first device processes the first packet.

BRIEF DESCRIPTION OF DRAWINGS

FIG. 2 is a schematic flowchart of a packet transmission method according to an embodiment of this application;

FIG. 3 is a schematic diagram of a structure of an SRH extension header according to an embodiment of this application;

FIG. 5 is a schematic diagram of an RH extension header according to an embodiment of this application;

FIG. 6 is a schematic diagram of a DOH extension header according to an embodiment of this application;

FIG. 9 is a schematic diagram of structures of packets transmitted by nodes in a network architecture according to an embodiment of this application;

FIG. 11 is a schematic diagram of hierarchical arrangement of a node information list according to an embodiment of this application;

FIG. 13 is a schematic diagram of structures of packets transmitted by nodes in a network architecture according to an embodiment of this application;

FIG. 14 is a schematic diagram of a compression encoding scheme used in a packet transmission method according to an embodiment of this application;

FIG. 15 is a schematic diagram of a compression encoding scheme used in a packet transmission method according to an embodiment of this application;

FIG. 16 is a schematic diagram of a compression encoding scheme used in a packet transmission method according to an embodiment of this application;

DESCRIPTION OF EMBODIMENTS

The following further describes in detail embodiments of this application with reference to accompanying drawings.

Figure 1:
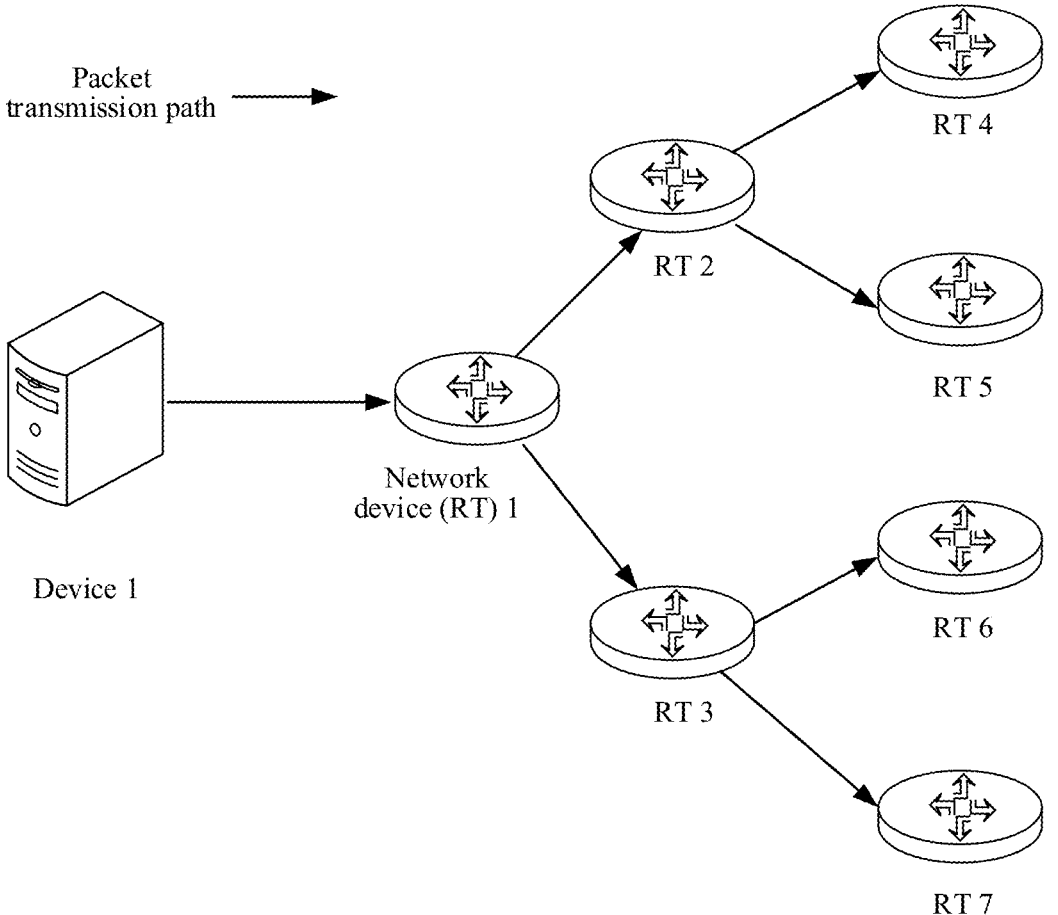
FIG. 1 is a schematic diagram of a network scenario of a packet transmission method according to an embodiment of this application.

To reduce complexity of a packet transmission process, reduce packet transmission overheads, and improve packet transmission efficiency, an embodiment of this application provides a packet transmission method. The method is applicable to a network scenario shown in FIG. 1. As shown in FIG. 1, the network scenario includes a packet sending device 1 and a plurality of packet receiving network devices RT 1 to RT 7. A packet sent by the device 1 is replicated and forwarded between the RT 1 to the RT 7. For example, the device 1 in this embodiment of this application includes but is not limited to a router, a switch, a server, and the like, and the network devices RT 1 to RT 7 include but are not limited to a router, a switch, a server, and the like. The plurality of packet receiving network devices RT 1 to RT 7 include: an ingress node, an intermediate node, and an egress node. The ingress node is a first-layer head node device that starts transmission on a packet transmission path. The intermediate node receives, on the packet transmission path, a packet sent by a previous-hop device, replicates the packet, and then forwards the packet to a next packet processing device.

In this embodiment, that a device processes a packet means that the device performs some operations, such as replicating, forwarding, decapsulating, and continuing to send the packet to an upper-layer device, which are not limited to only forwarding the packet. In an embodiment, the plurality of receiving devices may alternatively include an intermediate device that only forwards a packet but does not further process the packet. That the device does not process the packet means that the device directly forwards the packet to a next hop without performing any other operation. For brevity, the intermediate device is omitted in FIG. 1. The egress node is a last-layer node device on the packet transmission path. After receiving the packet sent by a previous-hop device, the egress node ends transmission of the packet on the path, decapsulates the packet, and forwards the packet to a next-hop device. In an embodiment, the next-hop device may be user equipment, for example, a user host.

In FIG. 1, the RT 1 is used as the ingress node to receive the packet sent by the device 1, replicate the packet, and forward the packet to a plurality of next-hop devices, namely, an RT 2 and an RT 3. The RT 2 and the RT 3 are used as intermediate nodes to receive the packet sent by the RT 1, then replicate the packet, and forward the packet to a plurality of corresponding next-hop devices. In an embodiment, the RT 2 corresponds to an RT 4 and an RT 5, and the RT 3 corresponds to an RT 6 and the RT 7. The RT 4, the RT 5, the RT 6, and the RT 7 are used as last-hop devices in the plurality of receiving devices to receive a packet sent by a corresponding previous-hop device, and complete the transmission of the packet on the path.

In an embodiment, the packet sent by the RT 1 carries a transmission path of the packet, and the transmission path is represented in a form of a node information list. In an embodiment, the packet sent by the RT 1 further carries information indicating a location of the device in the node information list and indicating a processing function. Each hop of network device performs processing, such as replicating, updating, and forwarding, on the packet based on the information carried in the packet.

With reference to the network scenario shown in FIG. 1, an example in which a first device performs the method is used to describe the packet transmission method according to this embodiment of this application. To reduce the packet transmission overheads and improve the packet transmission efficiency, in this embodiment of this application, the node information list of the packet is carried in an extension header of the packet, and a pointer indicating a next packet processing device is added. FIG. 2 is a flowchart of a packet transmission method according to an embodiment of this application. The method includes but is not limited to the following several processes.

Step 201: A first device obtains a first packet, where the first packet carries a destination address field and a node information list, and the destination address field includes a first part.

In this embodiment of this application, the node information list includes node information of a second device and node information of a third device. The second device and the third device are next packet processing devices after the first device on a transmission path of the first packet. That a device processes a packet means that the device performs some operations, such as replicating, decapsulating, and continuing to send the packet to an upper-layer device, which are not limited to only forwarding the packet.

In an embodiment, the node information list may include node information of the first device and a packet processing device that is located after the first device on the transmission path of the first packet, or may include only node information of the packet processing device that is located after the first device on the transmission path of the first packet. For example, the node information list includes node information of the first device, the second device, and the third device, or the node information list includes node information of the second device and the third device and does not include node information of the first device. When the node information list includes only the node information of the packet processing device that is located after the first device on the transmission path of the first packet, space occupied by the node information list may be reduced, so that packet transmission efficiency may also be improved.

The first part indicates that a location of the node information of the second device in the node information list is a start location, and a location of the node information of the third device in the node information list is an end location. Alternatively, the first part indicates a start location of the node information of the second device in the node information list and indicates an offset of a location of the third device in the node information list relative to a location of the second device in the node information list. A manner in which the first part identifies locations of the node information of the second device and the node information of the third device in the node information list is flexible. The first part and information indicated by the node information list are used, so that the first device can obtain a quantity of next packet processing devices and location information of the next packet processing device.

This embodiment of this application imposes no limitation on the first packet and a manner in which the first packet carries the node information list. The first packet and the manner in which the first packet carries the node information list include but are not limited to the following several manners.

Manner 1: The first packet is a segment routing over IPv6 (SRv6) packet, the SRv6 packet includes an IPv6 packet header, and the IPv6 packet header includes an IPv6 basic header and an SRH. The SRH is an extension header and carries the node information list. In this case, the node information list is a segment list of the SRH.

FIG. 3 shows an SRH extension header according to an embodiment of this application. The SRH extension header and the IPv6 basic header form the IPv6 packet header in the first packet. As shown in FIG. 3, a next header has a length of 8 bits, and identifies a type of a packet header after the SRH. An extension header length (ext hdr len) has a length of 8 bits, and identifies a length of an SRH header, and the length is a length occupied by the segment list. A routing type has a length of 8 bits, and identifies a type of a routing header. A first identifier (segment left) has a length of 8 bits, and indicates a location of a SID of a current packet processing device in the segment list. A last entry has a length of 8 bits, and identifies an entry of a last element including the segment list in the segment list. A flag has a length of 8 bits, and is a flag of a data packet. A tag has a length of 8 bits, and is a tag of data packets in a same group.

The node information list in the SRH is referred to as the segment list. Node information corresponding to a device on a packet transmission path in the segment list is referred to as a segment identifier (SID) of the device. The segment list includes a SID of each device on the packet transmission path. Each SID is in a form of an IPv6 address and occupies 128 bits. A SID of the SRH includes three parts: a locator, a function, and an argument. An address (the locator) is a node address allocated to a device in a network, and may be used for routing and aggregation. The function is a function identifier, and indicates a local instruction. For example, the local instruction may be a forwarding action that needs to be performed by the device. The argument stores a variable argument needed when the device executes an instruction. In an embodiment, a pointer defined in an argument field of the SID is a first part of a destination field.

For example, the pointer is defined in the argument (Args) field of the SID. A pointer in a SID corresponding to the first device indicates locations of SIDs of the second device and the third device in the segment list, for example, a start location and an end location of a next-layer packet processing device after the first device. For example, the pointer of the first device indicates that a location of a SID of the second device in the segment list is the start location and a location of a SID of the third device in the segment list is the end location, or may indicate that a location of a SID of the second device in the segment list is the start location and indicate an offset of a location of a SID of the third device in the segment list relative to the location of the SID of the second device in the segment list. The first device may determine, based on the pointer, a location of the next-layer packet processing device, and further determine, based on the offset, a quantity of packet replications that are needed.

Figure 4:
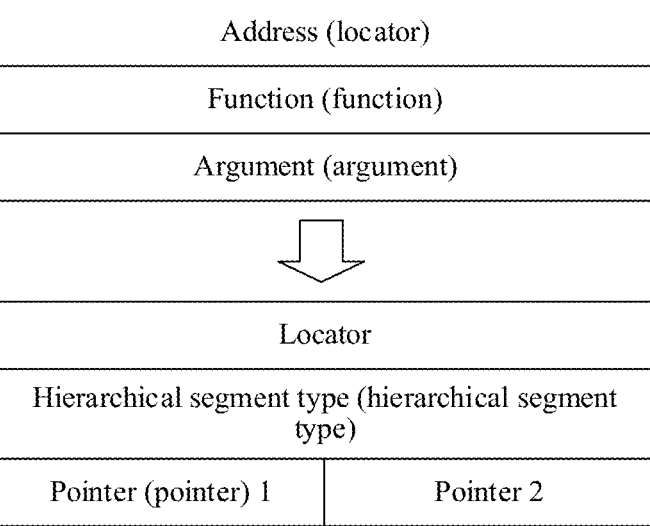
FIG. 4 is a schematic diagram of a structure of an extended SID according to an embodiment of this application.

In an embodiment of this application, the SID is extended. A structure of an extended SID may be shown in FIG. 4. In FIG. 4, the extended SID still includes three parts: a locator, a segment type (a hierarchical segment type) obtained through division, and a node pointer. The locator is still a node address, and may be used for routing and aggregation. The segment type (a hierarchical segment type) obtained through division stores a redefined field type for the extended SID. In this embodiment, the segment type obtained through division still stores a function identifier, the function identifier indicates a local instruction, and the local instruction indicates a forwarding action that needs to be performed by a device. The node pointer may include a pointer 1 and a pointer 2. An example in which the SID indicates the first device, and next-layer packet processing devices that are located after the first device are the second device and the third device is still used. The pointer 1 may indicate that a location of a SID of the second device in the segment list is a start location, and the pointer 2 indicates that a location of a SID of the third device in the segment list is an end location. In an embodiment, the pointer 1 may store a location of a SID of the second device in the segment list as a start location, and the pointer 2 indicates an offset of a location of the third device in the segment list relative to a location of the second device in the segment list. A quantity of target devices including the second device and the third device may be determined based on the pointer 2. The quantity of target devices is a sum of devices including the second device and the third device, in other words, the offset of the location of the third device in the node information list relative to the location of the second device in the node information list.

Manner 2: The first packet is an IPv6 packet, an IPv6 packet header includes an IPv6 basic header and a routing header (RH), an RH extension header carries the node information list, and the node information list is a segment list of the RH. A structure of each piece of node information in the segment list is similar to a structure of node information shown in FIG. 3. FIG. 5 shows an IPv6 extension header, namely, an RH, according to an embodiment of this application.

Manner 3: The first packet is an IPv6 packet, an IPv6 packet header includes an IPv6 basic header and a destination options header (DOH), a DOH extension header carries the node information list, and the node information list is an address list of the DOH. A structure of each piece of node information in a segment list is similar to a structure of node information shown in FIG. 3. FIG. 6 shows an IPv6 extension header, namely, a DOH, according to an embodiment of this application.

Regardless of the foregoing manners, an example in which packet processing devices that are located after the first device include the second device and the third device is used. The node information list includes the node information of the second device and the node information of the third device. The second device and the third device are the next-layer packet processing devices that are located after the first device on the transmission path of the first packet.

Figures 7, 8:
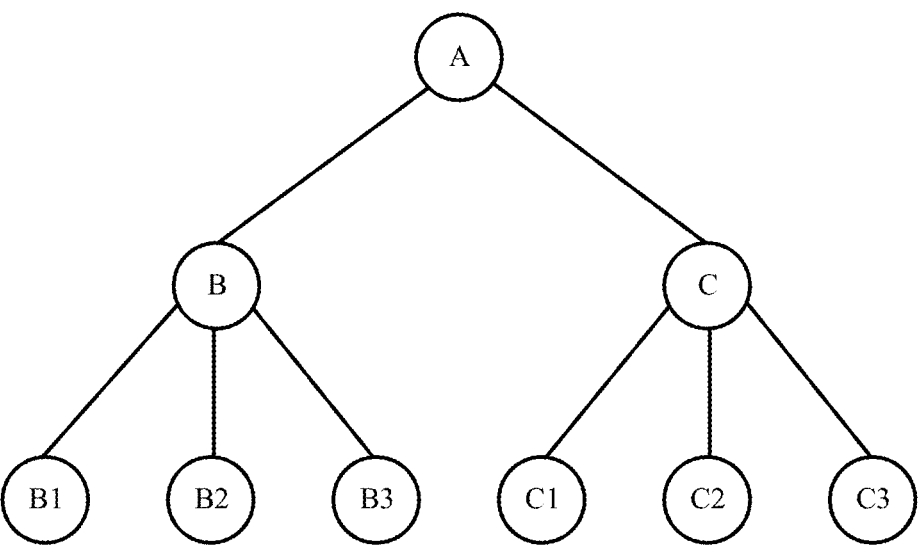
FIG. 7 is a schematic diagram of a packet transmission path according to an embodiment of this application.
FIG. 8 is a schematic diagram of hierarchical arrangement of a node information list according to an embodiment of this application.

FIG. 7 is a schematic diagram of a packet transmission path according to an embodiment of this application. The transmission path according to this embodiment is a point-to-multipoint path. In this embodiment, the packet transmission path is logically divided into layers, and nodes whose paths pass through a same quantity of bifurcations are considered as nodes at a same layer. As shown in FIG. 7, A is a first-layer packet processing device, B and C are second-layer packet processing devices, and B1, B2, B3, C1, C2 and C3 are third-layer packet processing devices. Further, A is an ingress node on the packet transmission path, B and C are intermediate nodes on the packet transmission path, and B1, B2, B3, C1, C2 and C3 are egress nodes on the packet transmission path. It can be learned from FIG. 7 that B and C are next-layer packet processing devices that are located after the node A. B1, B2, and B3 are next-layer packet processing devices that are located after the node B. The nodes C1, C2, and C3 are next-layer packet processing devices that are located after the node C.

FIG. 7 is merely example descriptions of the transmission path. Different transmission paths may be represented in forms of corresponding node information lists. The node information list is arranged in descending order of logical layers, and node information of same-layer packet processing devices that are located after a same device is successively arranged together. For example, a schematic diagram of hierarchical arrangement of a node information list corresponding to the transmission path shown in FIG. 7 is used. As shown in FIG. 8, a node A is a layer 1, nodes B and C are a layer 2, B1, B2, B3, C1, C2, and C3 are a layer 3.

For example, node information of each device in the node information list includes a locator and a node pointer. For any device, a node pointer in node information of the any device indicates a location, in the node information list, of node information of a packet processing device that is located after the any device on the transmission path. A node address in the node information of the any device indicates a location of the any device in a network.

In an embodiment, the node information of the packet processing device may further include a function identifier. The function identifier indicates an operation instruction for the packet processing device to perform an operation on the packet, that is, a function to be implemented. In this embodiment, a function identifier in each piece of node information includes but is not limited to a replication function. The node information list according to this embodiment of this application is used, so that a packet encoding process is simplified, and an operation specified in the node information list is used, so that an explicit path for packet transmission can be controlled. This reduces maintenance work for a network node and improves packet transmission efficiency.

In an embodiment, a destination address field includes a first part, and the first part identifies locations of node information of a second device and node information of a third device in the node information list. For a case in which a first device is an intermediate node on a transmission path of a first packet, the destination address field further includes a second part, and the second part indicates a location of the first device in the network. For example, the second part identifies an address of the first device. Node information of any device of the second device and the third device includes a node address and a node pointer, the node address indicates a location of the any device in the network, and the node pointer indicates a location, in the node information list, of node information of a packet processing device that is located after the any device of the second device and the third device on the transmission path.

It should be noted that, the second part in the destination address field is consistent with a node address included in node information of the first device, the first part in the destination address field is consistent with a node pointer of the first device, and the node information of the first device may be included in the node information list.

In an embodiment, that a first device obtains a first packet includes but is not limited to the following two cases.

Case 1: The first device is an ingress node on the transmission path of the first packet. The first device receives a fifth packet, and adds the first part and the second part to a destination address field of the fifth packet, to obtain the first packet. The second part identifies the address of the first device.

For example, the fifth packet is a packet received by the ingress node. For example, in correspondence to the network scenario shown in FIG. 1, the fifth packet is the packet received by the RT 1 from the device 1. In addition, in this embodiment, the node information list not only includes node information of each packet processing device that is located after the first device on the transmission path of the first packet, but also includes the node information of the first device. Further, in this embodiment, the first device is the ingress node on the transmission path of the first packet, in other words, the node information list includes node information of packet processing devices that are located on the transmission path of the first packet.

For example, that the first device further adds the node information list to the fifth packet includes: adding an IPv6 extension header to the fifth packet, where the IPv6 extension header carries the node information list, and the node information list includes the node information of the first device and the node information of the packet processing device that is located after the first device. In an embodiment, that the first device adds the second part and the first part to the fifth packet includes: The first device places the node information corresponding to the first device in the node information list carried in the IPv6 extension header into the destination address field of the fifth packet. In this case, a node address stored in the destination address field is the second part, and a stored node pointer is the first part. In this way, the first packet is obtained based on the fifth packet.

Case 2: The first device is an intermediate node on the transmission path of the first packet. That a first device obtains a first packet includes: receiving the first packet sent by a previous-hop device. As the intermediate node, the first device does not need to add the first part, the second part, and the node information list to the received packet. The first packet received by the first device already carries the destination address field and the node information list, and the destination address field carries the first part and the second part. For example, in correspondence to the network scenario shown in FIG. 1, the RT 2 is used as the first device to receive the first packet sent by the RT 1, and the first packet carries the second part, the first part, and the node information list.

Step 202: The first device determines the node information of the second device and the node information of the third device from the node information list based on the first part.

As described above, the first part identifies the locations of the node information of the second device and the node information of the third device in the node information list. After obtaining the first packet, the first device determines, from the node information list, next packet processing devices that are located after the first device on the transmission path of the packet, that is, the node information of the second device and the node information of the third device, to generate a corresponding second packet that needs to be sent to the second device and a corresponding third packet that needs to be sent to the third device.

It should be noted that, the second device and the third device in this embodiment indicate that a quantity of the next packet processing devices that are located after the first device on the transmission path of the first packet is two, and the two devices may continue to forward the packet by using the packet transmission method according to this embodiment of this application. In other words, in operation, after obtaining the first packet, the first device determines, from the node information list, that the next packet processing devices that are located after the first device on the transmission path of the packet further include node information of a fourth device and node information of a fifth device. In this case, the quantity of the next packet processing devices that are located after the first device is four, and the first device needs to send the packet to the fourth device and the fifth device. Similarly, the fourth device and the fifth device may continue to forward the packet by using the packet transmission method according to this embodiment of this application.

Step 203: The first device generates the second packet and the third packet based on the first packet, where the second packet includes the node information of the second device, and the third packet includes the node information of the third device.

In this embodiment, the first device may first obtain, based on the first part and the node information list that are carried in the first packet, the second packet corresponding to the second device, and then the first device obtains the third packet corresponding to the third device in a manner of obtaining the second packet. Certainly, the third packet may alternatively be first obtained, and then the second packet is obtained. A sequence of obtaining the second packet and the third packet is not limited in this embodiment of this application.

In an embodiment, that the first device generates the second packet based on the first packet includes but is not limited to the following several processes.

2031: The first device replicates the first packet based on the first part to obtain a fourth packet.

The first device determines, based on the first part carried in the first packet, a quantity of next-layer target packet processing devices. For example, the target devices are the second device and the third device, and the quantity of target devices is a sum of devices including the second device and the third device. The first device then determines, based on the determined quantity of target devices, a quantity of first packet replications.

For example, the first device reads the destination address field of the first packet. It is learned, based on the second part of the destination address field, that a current packet processing device is the first device. Then, based on a function identifier of the destination address field, an instruction to be executed by the first device is obtained. In this embodiment, the function identifier includes but is not limited to a replication instruction. After obtaining the replication instruction from the function identifier, the first device reads the first part from the destination address field. In an embodiment, the first part includes a start location and an end location of the node information of the second device and the node information of the third device in the node information list. A location of the node information of the second device in the node information list is the start location, and a location of the node information of the third device in the node information list is the end location. The node information list may further include node information of one or more fourth devices between the start location and the end location. The fourth device is a packet processing device, other than the second device and the third device, located after the first device. The first device obtains, based on information indicated by the first part, a quantity of devices including the second device and the third device, in other words, a quantity of target devices that need to replicate the first packet.

In an embodiment, that the first device determines, based on the first part, the quantity of target devices including the second device and the third device includes: calculating an offset based on that the first part indicates the start location and the end location of the second device and the third device in the node information list, and using the offset as the quantity of target devices. Alternatively, if the first part includes the start location indicated by using the node information of the second device in the node information list and the offset of the location of the third device in the node information list relative to the location of the second device in the node information list, the first device reads the quantity of target devices including the second device and the third device that is carried in the first part. For example, in this embodiment, the quantity of target devices is two. A packet obtained through replicating the first packet is referred to as a fourth packet.

The first device determines the location of the node information of the second device in the node information list based on the first part, and obtains the node information of the second device based on the location of the node information of the second device in the node information list. In other words, because the first part further indicates the locations of the node information of the second device and the node information of the third device in the node information list, after obtaining the quantity of target devices that need to replicate the first packet, the first device locates and obtains the node information of the second device and the third device in the node information list based on an indication of the first part.

2032: The first device adds the node information of the second device to the fourth packet to obtain the second packet.

In an embodiment, that the first device adds the node information of the second device to the fourth packet to obtain the second packet includes the following several steps.

20321: The first device updates a destination address field in the fourth packet based on the node information of the second device.

After obtaining the node information of the second device and the node information of the third device, the first device updates the destination address field in the fourth packet based on the node information of the second device. An updated destination address field of the packet carries an updated second part and an updated first part, the updated second part is a node address of the second device, and the updated first part is a node pointer of the second device. The updated second part indicates a location of the second device in the network, and the updated first part indicates a location, in the node information list, of node information of a next packet processing device that is located after the second device on the transmission path of the packet.

In an embodiment, that the first device updates a destination address field in one fourth packet based on the node information of the second device includes: The first device fills the node information of the second device in the destination address field of the one fourth packet. In this case, the first part is overwritten by a new node pointer, the node pointer carried in the destination address field is recorded as the updated first part, the second part is overwritten by a new node address, and the node address carried in the destination address field is the updated second part.

20322: The first device obtains the second packet based on an updated fourth packet.

In an embodiment, that the first device obtains the second packet based on an updated fourth packet includes but is not limited to the following three processing manners.

Processing manner 1: That the first device obtains the second packet based on an updated fourth packet includes: using the updated fourth packet as the second packet.

After updating the packet, the first device may directly use the updated fourth packet as the second packet, and perform a next sending operation. The first device may also further process the updated packet, to reduce packet overheads.

Processing manner 2: That the first device obtains the second packet based on an updated fourth packet includes:

popping up an extension header in the updated fourth packet based on that the updated first part in the updated fourth packet indicates that there is no packet processing device that is located after the second device on the transmission path, and using a packet as the second packet after popping up the extension header. For example, an IPv6 packet header includes an IPv6 basic header and an IPv6 extension header. For a process of popping up the IPv6 extension header in Processing manner 2, content of the popped-up IPv6 extension header varies with a structure of the updated fourth packet. For example, if the updated fourth packet is an IPv6 packet, the popped-up IPv6 extension header is an RH. Alternatively, if the updated fourth packet is an IPv6 packet, the popped-up IPv6 extension header is a DOH. Alternatively, if the updated fourth packet is an SRv6 packet, the popped-up IPv6 extension header is an SRH.

In an embodiment, the first device determines, based on a value of the updated first part, whether there is a packet processing device that is located after the second device on the transmission path. For example, the value of the updated first part is used as a reference value, and there is no packet processing device after the second device. For example, the reference value may be 0. In this case, the updated first part is 0. This represents that there is no packet processing device after the second device on the transmission path of the packet. Therefore, the first device pops up the IPv6 extension header of the updated fourth packet, to reduce the packet overheads. For a structure of the IPv6 packet header, refer to the descriptions in the following Processing manner 3. Details are not described herein.

Processing manner 3: That the first device obtains the second packet based on an updated fourth packet includes: processing a node information list in the updated fourth packet to obtain a processed packet, and obtaining the second packet based on the processed packet, where a node information list in a processed packet includes only node information of a packet processing device that is located after the first device on the transmission path.

To further reduce the packet overheads, the first device may further process the node information list of the updated fourth packet. In an embodiment, the first device selectively removes, from the node information list, node information of a branch device that is not needed, so that a processed node information list includes only the node information of the second device and the packet processing device after the second device. In this way, space occupied by the node information list carried in the second packet is significantly reduced, and packet transmission efficiency is also improved.

Further, for Processing manner 3, after the processed packet is obtained, the obtaining the second packet based on the processed packet includes but is not limited to using the processed packet as the second packet, or popping up an IPv6 extension header in the processed packet based on that an updated first part in the processed packet indicates that there is no packet processing device that is located after the second device on the transmission path, and using a packet as the second packet after popping up the IPv6 extension header. An IPv6 packet header includes an IPv6 basic header and an IPv6 extension header. For a process of popping up the IPv6 extension header in Processing manner 3, content of the popped-up IPv6 extension header varies with a structure of the processed packet. For example, if the processed packet is an IPv6 packet, the popped-up IPv6 extension header is an RH. Alternatively, if the processed packet is an IPv6 packet, the popped-up IPv6 extension header is a DOH. Alternatively, if the processed packet is an SRv6 packet, the popped-up IPv6 extension header is an SRH.

It should be noted that, regardless of the foregoing processing methods, an address and a pointer that are carried in a destination address field of the second packet and that are obtained by the first device based on the updated fourth packet are the same as the updated second part and the updated first part that are carried in the updated fourth packet. That is, the second packet carries the updated second part and the updated first part.

Further, for a manner in which the first device obtains the third packet corresponding to the third device, refer to the foregoing process of obtaining the second packet. Details are not described herein again.

In an embodiment, the first packet, the second packet, and the third packet each further carry a first identifier, and the first identifier indicates a location of node information of a current packet processing device in the node information list. In an embodiment, the first identifier may be a sequence of the node information of the current packet processing device in the node information list. For example, the node information of the current packet processing device is arranged in a third piece in the node information list, and a sorting manner starts from a first piece of node information in ascending order from 0. In this case, the first identifier is 2. In an embodiment, when the first device obtains the second packet or the third packet based on the fourth packet, a process of updating a first identifier of the fourth packet is included, so that the obtained second packet or the obtained third packet can indicate, by using the first identifier, a device that processes the second packet or the third packet. For example, after that the first device updates a destination address field in one fourth packet based on the node information of the second device, the method further includes: updating the first identifier of the fourth packet based on the node information of the second device.

In a packet transmission process, a specified device may further be set. The specified device is not only used as an intermediate node on a current packet transmission path to connect to another router node, but also used as an edge device to connect to a user host. In other words, the device not only sends a packet to a next-hop packet processing device, but also is used as an egress node on another path to decapsulate a packet. A node having the foregoing functions is referred to as a composite node. As described above, an egress node on the current packet transmission path also needs to decapsulate a packet. In this case, in the packet transmission process, there are two types of packet decapsulation nodes, one is the composite node, and the other is the foregoing egress node. The two types of packet decapsulation nodes are referred to as leaf nodes. Therefore, in an embodiment of this application, an identifier is added to a packet, to indicate whether a device is a composite node or an egress node, that is, whether the device is a leaf node. After it is determined that the device is a leaf node, it is further determined whether the node is a composite node or an egress node by using a first part. If the node is a composite node, the packet is replicated once, and a replicated packet is decapsulated. If the node is an egress node, the packet is directly decapsulated.

In an embodiment, a first packet further carries a leaf identifier, and the leaf identifier indicates that a first device is a leaf node. In an embodiment, after that a first device obtains a first packet, the method further includes: The first device replicates the first packet at least once, and decapsulates at least one replicated first packet based on that the leaf identifier carried in the first packet indicates that the first device is a leaf node and the first part indicates that there is a packet processing device that is located after the first device on the transmission path. It should be noted that, the at least one replicated first packet is at least one replicated first packet in addition to the second packet and the third packet that are obtained by the first device based on the first part and the node information list. For example, after decapsulating the fourth packet, the first device performs, based on an original first packet, a step of obtaining the second packet and the third packet based on the first part and the node information list. Alternatively, the first device decapsulates the first packet based on that the leaf identifier carried in the first packet indicates that the first device is a leaf node and the first part indicates that there is no packet processing device that is located after the first device on the transmission path. In an embodiment, after that the first device updates a destination address field in one fourth packet based on the node information of the second device, the method further includes: updating a leaf identifier of the fourth packet based on the node information of the second device.

In an embodiment, two leaf identifiers are configured for the first device, one of the two leaf identifiers indicates that the first device is a leaf node, and the other leaf identifier indicates that the first device is not a leaf node. The first packet carries one of the two leaf identifiers. For example, if the first device is a leaf node, the first packet carries the leaf identifier indicating that the first device is a leaf node. Alternatively, if the first device is not a leaf node, the first packet carries the leaf identifier indicating that the first device is not a leaf node. In this manner, two leaf nodes need to be configured for one device, and different leaf identifiers are carried based on different situations. In addition to a case in which the two leaf identifiers are configured, the method according to this embodiment of this application further supports configuration of one leaf identifier for one device, and whether the device is a leaf node is indicated by using different values. For example, one leaf identifier is configured for the first device, the leaf identifier has a first value and a second value, the first value indicates that the first device is a leaf node, the second value indicates that the first device is not a leaf node, and a value of the leaf identifier carried in the first packet is the first value or the second value. For example, if the first device is a leaf node, the first packet carries a leaf identifier with the first value. Alternatively, if the first device is not a leaf node, the first packet carries a leaf identifier with the second value.

In a packet transmission process, to further reduce a size of a packet and improve transmission efficiency, the packet may be further encoded by using a common prefix, so that a packet encoded by using the common prefix may be compressed and transmitted by using a header compression technology, and packet overheads are further reduced. In an embodiment, a second part includes a common prefix and a node identifier, the common prefix includes a same part of node addresses in node information of packet processing devices on the transmission path, and the node identifier indicates a different part of the node addresses in the node information of the packet processing devices on the transmission path. In an embodiment, the common prefix further includes a same function identifier of the packet processing devices on the transmission path. The function identifier indicates a function to be performed by each device.

In addition, in another embodiment, the node information list includes a segment list, and one or more segment identifiers in the segment list do not include the common prefix. In an embodiment, a length of any one of the one or more segment identifiers is less than 128 bits.

In the packet transmission process, there may be some devices that only forward the packet but do not process the packet according to the foregoing method and an intermediate router, a switch, and the like that only forward the packet. To improve packet transmission efficiency, the packet may be enabled to traverse these devices that only forward the packet. In an embodiment, the first device is an intermediate node on the transmission path of the first packet, and before the first device obtains the second packet corresponding to the second device and the third packet corresponding to the third device based on the first packet, the method further includes: The first device determines that a second part carried in the first packet is an address of the first device in a network. That is, the second part matches the address of the first device. If the second part is consistent with the address of the first device in the network, the first device continues to perform the step of obtaining, based on the first part and the node information list, the second packet corresponding to the second device and the third packet corresponding to the third device.

In an embodiment, the first device is an intermediate node on the transmission path of the first packet, and before the first device obtains, based on the first part and the node information list, the second packet corresponding to the second device and the third packet corresponding to the third device, the method further includes: The first device determines that a second part of the first packet is not an address of the first device in a network, that is, the second part does not match the address of the first device, and the first device forwards the first packet based on the second part of the first packet.

In an embodiment, the first device is an egress node on the transmission path of the first packet, and after the first device obtains the first packet, the method further includes: The first device decapsulates the first packet based on that the first part indicates that there is no packet processing device after the first device on the transmission path, that is, the first device is the egress node on the transmission path.

In an embodiment, the node information list further includes node information of a device that is on the transmission path of the first packet and that does not process the packet. In this embodiment, the node information of the device that does not process the packet does not include a replication instruction, and a first part only points to a location of a next-hop device in the node information list.

It should be noted that, the first device locally stores a forwarding information base (FIB). The FIB provides routing information, instruction information, processing information, and the like corresponding to each identifier and pointer in a destination address field. In an embodiment, the FIB may be delivered to each device on the transmission path of the first packet by flooding.

Step 204: The first device sends the second packet to the second device, and sends the third packet to the third device.

The first device sends the second packet to the second device after obtaining the second packet, and sends the third packet to the third device after obtaining the third packet. In an embodiment, the first device may find a location of the second device in the network based on an updated second part carried in a destination address field of the second packet, and send the second packet to the second device. A sequence of sending the second packet and sending the third packet is not limited in this embodiment of this application.

According to the method provided in this embodiment of this application, the node information list and the first part are added to indicate a device to transmit the packet. For example, the packet is transmitted from the first device to the second device and the third device. The node information list includes the node information of the second device and the node information of the third device. The first part indicates the locations of the node information of the second device and the node information of the third device in the node information list. According to the method provided in this embodiment of this application, during packet transmission, a next packet receiving and processing device can be quickly located based on the locations of the node information of the second device and the node information of the third device in the node information list, so that steps in the packet transmission process are simplified, overheads are reduced, and transmission efficiency is improved.

In addition, in this embodiment of this application, with reference to a penultimate hop popping method, the leaf identifier, and further processing of the node information list, the size of the packet is reduced, the packet transmission overheads are further reduced, and the transmission efficiency is improved.

FIG. 9 is a schematic diagram of structures of packets transmitted by nodes in a network architecture according to an embodiment of this application. In this embodiment of this application, an example in which the packet is transmitted on the packet transmission path shown in FIG. 7 and a used IPv6 extension header is a segment routing header SRH is used to describe a method according to this embodiment of this application. In FIG. 9, a node in a second column of the packet represents a node address, and a leaf in a third column represents a node pointer. In a segment list in this embodiment, there is no sequence number in an actual packet, but represents that a location of each SID in the segment list increases sequentially. In an embodiment, "128 bit" next to a tag field represents a SID whose sequence number is 0, and SIDs whose sequence numbers are respectively 1, 2, . . . , and 8 are sequentially displayed below. It should be noted that, in this embodiment, a first identifier is the same as a sequence number of a SID. For example, in a packet sent by a device A to a device B, the device B corresponds to a SID whose sequence number is 1. Therefore, a first identifier of the packet is 1. Similarly, in a packet sent by the device A to a device C, a first identifier is 2. In packets sent by the device B to devices B1 to B3, first identifiers are respectively 3 to 5. In packets sent by the device C to devices C1 to C3, first identifiers are respectively 6 to 8.

In an SRH header, each SID includes a node address, a function identifier, and a node pointer. In this embodiment, a node address 2001:db8:1:2:: with a 64-bit mask is configured for a SID of the device A for routing and aggregation. A function identifier is configured in 32 bits that immediately following the address block, and a replication function in this embodiment is represented by using 1234:1234. A node pointer is configured in 32 bits immediately following the function identifier. The first 16 bits store a start location of a SID of a next packet processing device in the segment list, and the last 16 bits store an end location of the SID of the next packet processing device in the segment list. In this embodiment, ::1 indicates that the start location of the SID of the next packet processing device in the segment list is a location with a SID whose sequence number is 1, and ::2 indicates that the end location of the SID of the next packet processing device in the segment list is a location with a SID whose sequence number is 2. Therefore, in this embodiment, the SID whose sequence number is 0 is represented as follows: 2001:db8:1:2:1234:1234:1:2.

Similarly, a node address of the device B is: 2001:db8:1:3::. Therefore, the SID whose sequence number is 1 is represented as follows: 2001:db8:1:3:1234:1234:3:5. A node address of the device C is 2001:db8:1:4::. Therefore, the SID whose sequence number is 2 is represented as follows: 2001:db8:1:4:1234:1234:6:8. A node address of the device B1 is 2001:db8:1:5::. Therefore, a SID whose sequence number is 3 is represented as follows: 2001:db8:1:5:1234:1234:0:0. A node address of a device B2 is 2001:db8:1:6::. Therefore, a SID whose sequence number is 4 is represented as follows: 2001:db8:1:6:1234:1234:0:0. A node address of the device B3 is 2001:db8:1:7::. Therefore, a SID whose sequence number is 5 is represented as follows: 2001:db8:1:7:1234:1234:0:0. A node address of the device C1 is 2001:db8:1:8::. Therefore, a SID whose sequence number is 6 is represented as follows: 2001:db8:1:8:1234:1234:0:0. A node address of a device C2 is 2001:db8:1:9::. Therefore, a SID whose sequence number is 7 is represented as follows: 2001:db8:1:9:1234:1234:0:0. A node address of the device C3 is 2001:db8:1:a::. Therefore, a SID whose sequence number is 8 is represented as follows: 2001:db8:1:a:1234:1234:0:0.

It should be noted that, in correspondence to the flowchart of the packet transmission method shown in FIG. 2, any device on the packet transmission path in this embodiment may be considered as the first device when obtaining and sending a packet, a received packet may be considered as the first packet when the any device is used as an intermediate node, a sent packet may be considered as the second packet, and a plurality of next-hop packet processing devices that are corresponding to the device may be considered as the second device and the third device. That is, the packet transmission method shown in FIG. 2 is applicable to each device on the packet transmission path in this embodiment.

In this embodiment, A is used as a first device, and a packet transmission method performed by the device A includes but is not limited to the following several steps.

9011: The device A obtains a packet corresponding to the device A, where the packet corresponding to the device A carries a destination address field and a node information list, and the destination address field includes a second part and a first part.

In an embodiment, that the device A is used as an ingress node to obtain the packet corresponding to the device A includes but is not limited to: The device A obtains a fifth packet, where the fifth packet is a to-be-transmitted packet received by the device A. The device A adds the node information list to the fifth packet, in this embodiment, encapsulates the packet by using an SRH that carries a segment list as an IPv6 extension header, where the segment list in this embodiment carries the SID of the device A. The device A adds the first part and the second part to the fifth packet based on node information of the device A. In this embodiment, the device A fills a first SID (a SID 0), for example, 2001:db8:1:2:1234:1234:1:2, in the segment list into a destination address field of an encapsulated packet, to obtain the packet corresponding to the device A. In this case, ":1:2" in the destination address field is the first part, and "2001: db8:1:2:" is the second part.

9012: The device A determines node information of the device B and node information of the device C from the node information list based on the first part.

The first part identifies locations of the node information of the device B and the node information of the device C in the node information list.

9013: The device A obtains a packet corresponding to the device B and a packet corresponding to the device C based on the packet corresponding to the device A.

After obtaining the packet corresponding to the device A, the device A separately generates, based on the first part and the node information list in the packet, the packet corresponding to the device B and the packet corresponding to the device C.

In an embodiment, the step in which the device A generates the packet corresponding to the device B includes: The device A determines, based on the first part, a quantity of next-layer target packet replication and processing devices and the devices. The device A replicates the packet a quantity of times that is the same as the quantity of target devices. The device A determines a location of a SID of the device B in the segment list based on the first part, and obtains the SID of the device B based on the location of the SID of the device B in the segment list. The device A updates a destination address field in one replicated packet based on the SID of the device B. The device A obtains the packet corresponding to the device B based on an updated replicated packet.

In an embodiment, the packet further carries a first identifier, and the first identifier indicates a location of a SID of a current packet processing device in the segment list. After the device A updates the destination address field in the one replicated packet based on the SID of the device B, the device A further updates a first identifier of the replicated packet corresponding to the device A based on the SID of the device B.

For example, the device A reads the destination address field (DA) field to obtain the following information: 1. The destination address field of the packet is the SID of the device A. 2. 1234:1234 in the destination address field indicates a replication instruction. 3. The first part indicates that a start location and an end location that are of SIDs of next packet processing devices in the segment list are respectively 1 and 2. Based on the foregoing information, the device A determines that the quantity of target devices including the device B and the device C is two. In an embodiment, the packet corresponding to the device A needs to be replicated twice, and devices to which replicated packets are to be sent are devices indicated by the SIDs whose locations are respectively 1 and 2 in the segment list. The device A replicates the packet twice, locates node information, for example, a SID 1 and a SID 2, of the device B and the device C in the segment list based on an indication of the first part, and fills the SID 1, for example, 2001:db8:1:3:1234:1234:3:5, into a DA field of one replicated packet corresponding to the device A. In this case, the first part ":1:2" of the replicated packet is updated to an updated first part ":3:5" and the second part "2001:db8:1:2:" is updated to an updated second part "2001:db8:1:3". In an embodiment, the packet corresponding to the device A further carries a first identifier. After updating the packet, the device A sets a first identifier (segment left) field in the packet from 0 to 1. The device A fills the SID 2, for example, 2001:db8:1:4:1234:1234:6:8, into a DA field of another replicated packet. In this case, the first part ":1:2" of the replicated packet is updated to an updated first part ":6:8", the second part "2001:db8:1:2:" is updated to a third address "2001:db8:1:4:", and the first identifier in the packet is set from 0 to 2.

9014: The device A sends a corresponding packet to the device B, and sends a corresponding packet to the device C.

The device A separately sends, based on location information, for example, 2001:db8:1:3: and 2001:db8:1:4:, indicated by node addresses in DA fields, two replicated packets that carry different DA fields as the packet corresponding to the device B and the packet corresponding to the device C respectively to corresponding devices, for example, the devices B and C.

If the packet is sent to the device B, the device B may perform a function performed by the first device in the method shown in FIG. 2. Because the device B is an intermediate node in the network architecture shown in FIG. 9, a packet transmission method performed by the device B includes but is not limited to the following several steps.

9021: The device B obtains the packet corresponding to the device B, where the packet corresponding to the device B carries a destination address field and a node information list, and the destination address field includes a second part and a first part.

The device B directly receives the packet sent by the device A, uses the packet as the packet corresponding to the device B, and processes and transmits the packet corresponding to the device B according to the packet transmission method shown in FIG. 2.

9022: The device B determines node information of the devices B1 to B3 from the node information list based on a first part.

The first part identifies locations of the node information of the devices B1 to B3 in the node information list.

9023: The device B obtains packets respectively corresponding to the devices B1 to B3 based on the packet corresponding to the device B.

After receiving the packet that is corresponding to the device B and that is sent by the device A, the device B obtains, based on the first part and the node information list, the packets respectively corresponding to the devices B1 to B3. In an embodiment, the device B reads a DA field of the packet corresponding to device B to obtain the following information: 1. A destination address field of the packet is the SID of the device B. 2. 1234:1234 in the destination address field indicates a replication instruction. 3. The first part indicates that a start location and an end location that are of next packet processing devices in the segment list are respectively 3 and 5. The device B determines, based on the foregoing information, that a quantity of next target packet processing devices is three. In an embodiment, the packet corresponding to the device B needs to be replicated three times, and devices to which replicated packets are to be sent are devices indicated by SIDs whose sequence numbers are respectively 3, 4, and 5. The device B replicates the packet three times, and locates node information, for example, a SID 3, a SID 4, and a SID 5, of the next packet processing devices in the segment list based on an indication of the first part. The SID 3 is filled into a DA field of one replicated packet. In this case, the first part ":3:5" of the replicated packet is updated to ":0:0", the second part "2001:db8:1:3:" is updated to "2001:db8:1:5:", and the first identifier (segment left) in the packet is set from 1 to 3, to obtain one packet. The SID 4 is filled into a DA field of another replicated packet. In this case, the first part ":3:5" of the replicated packet is updated to ":0:0", the second part "2001:db8:1:3:" is updated to "2001:db8:1:6:", and the first identifier (segment left) in the packet is set from 1 to 4, to obtain one packet. The SID 5 is filled into a DA field of the remaining replicated packet. In this case, the first part ":3:5" of the replicated packet is updated to ":0:0", the second part "2001:db8:1:3:" is updated to "2001:db8:1:7:", and the first identifier (segment left) in the packet is set from 1 to 5, to obtain one packet.

9024: The device B sends corresponding packets to the devices B1 to B3.

Then, the device B separately sends the obtained plurality of packets to the devices, for example, the devices B1 to B3, indicated by the SIDs whose locations are respectively 3, 4, and 5 in the segment list. After receiving the packet sent by the device A, the device C also replicates the packet three times according to the foregoing method, correspondingly modifies the DA field and the first identifier, and then separately sends corresponding packets to devices, for example, the devices C1 to C3, indicated by SIDs whose locations are respectively 6, 7, and 8 in the segment list. Details are not described herein in this embodiment of this application.

After the device B1 receives a packet that is corresponding to the device B1 and that is sent by the device B, the device B1 performs a function performed by the first device in the method shown in FIG. 2. Because the device B is an egress node and used as a first device in the network architecture shown in FIG. 9, a packet transmission method performed by the device B1 includes but is not limited to the following several steps.

9031: The device B1 obtains the packet corresponding to the device B1, where the packet corresponding to the device B1 carries a destination address field and a node information list, and the destination address field includes a first part and a second part.

The device B1 receives the packet sent by the device B.

9032: The device B1 decapsulates, based on that the first part indicates that there is no packet processing device after the device B1, that is, the device B1 is an egress node on a transmission path, the packet corresponding to the device B1.

For example, the device B1 reads the DA field of the packet corresponding to the device B1 to obtain the following information: 1. The destination address field of the packet is a SID of the device B1. 2. 1234:1234 in the destination address field indicates a replication instruction. 3. The first part indicates that the device does not have a next packet processing device. The device B1 learns, based on the foregoing information, that the packet is transmitted to a last device on the path, and does not replicate the packet any more, to complete transmission of the packet on the path. In an embodiment, because B1 is the egress node on the packet transmission path, B1 may further decapsulate the packet.

Similarly, after receiving packets sent by the device B, the devices B2 and B3 also complete transmission of the packet on the path according to the foregoing packet processing method of the device B1. After receiving the packets sent by the device C, the devices C1, C2, and C3 also complete transmission of the packet on the path according to the foregoing packet processing method of the device B1. Details are not described herein in this embodiment of this application.

Figure 10:
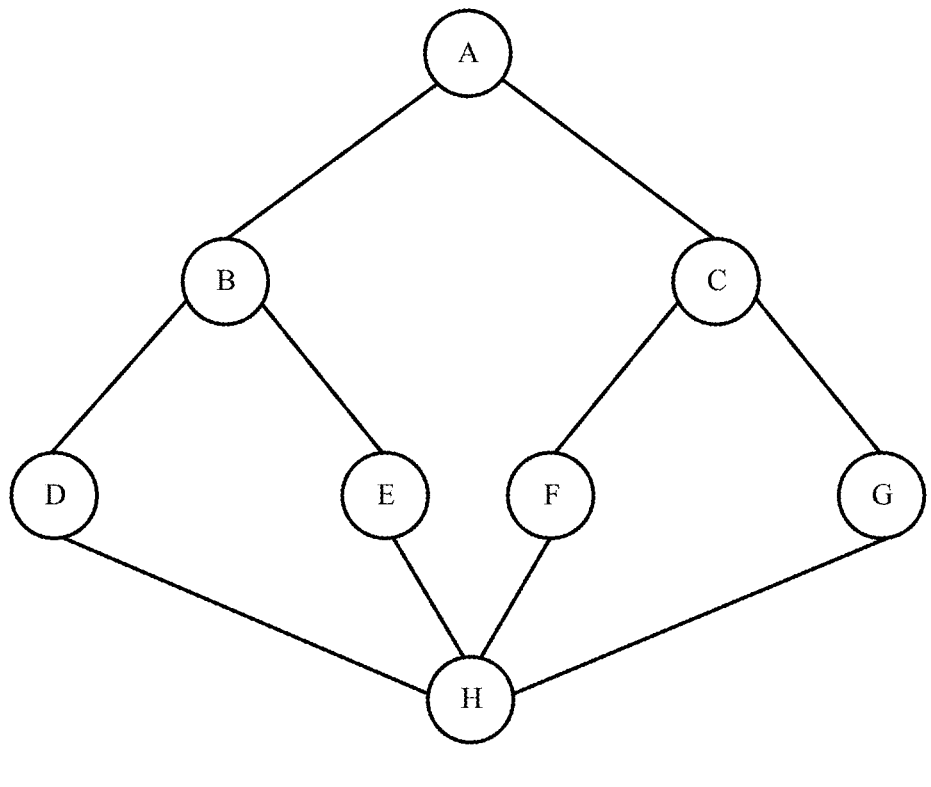
FIG. 10 is a schematic diagram of a packet transmission path according to an embodiment of this application.

FIG. 10 shows a packet transmission path according to an embodiment of this application. In this example, the packet transmission path is multipath, that is, point-to-multipoint-to-point, which is used in a load balancing scenario, an/a active/standby protection scenario, a redundancy protection scenario, and the like. In this example, the packet transmission path is logically divided into layers, and nodes whose paths pass through a same quantity of bifurcations are used as nodes at a same layer. As shown in FIG. 10, a node A is a first-layer packet processing device, points B and C are second-layer packet processing devices, D, E, F, and G are third-layer packet processing devices, and H is a fourth-layer packet processing device. FIG. 11 shows a hierarchical arrangement of a node information list according to an embodiment of this application, and the node information list is corresponding to the packet transmission path shown in FIG. 10. In an embodiment, a packet transmission method corresponding to FIG. 10 and FIG. 11 includes the following several steps.

In this embodiment, A is used as a first device, and a packet transmission method performed by the device A includes but is not limited to the following several steps.

10011: The device A obtains a packet corresponding to the device A, where the packet corresponding to the device A carries a destination address field and a node information list, and the destination address field includes a second part and a first part.

That the device A is used as an ingress node to obtain the packet corresponding to the device A includes but is not limited to: The device A obtains a fifth packet, where the fifth packet is a to-be-transmitted packet received by the device A. The device A adds the node information list to the fifth packet, in this embodiment, encapsulates the packet by using an SRH that carries a segment list as an IPv6 extension header, where the segment list in this embodiment carries a SID of the device A. The device A adds the first part and the second part to the fifth packet based on node information of the device A. In this embodiment, the device A fills a first SID (a SID 0) in the segment list into a destination address field of an encapsulated packet, to obtain the packet corresponding to the device A.

10012: The device A determines node information of a device B and node information of a device C from the node information list based on the first part.

The first part identifies locations of the node information of the device B and the node information of the device C in the node information list.

10013: The device A obtains a packet corresponding to the device B and a packet corresponding to the device C based on the packet corresponding to the device A.

After obtaining the packet corresponding to the device A, the device A obtains, based on the first part and the node information list, the packet corresponding to the device B and the packet corresponding to the device C.

In an embodiment, the step in which the device A obtains the packet corresponding to the device B includes: The device A determines, based on the first part, a quantity of target devices including the device B and the device C. The device A replicates the packet corresponding to the device A for a quantity of times that is the same as the quantity of target devices. The device A determines a location of a SID of the device B in the segment list based on the first part, and obtains the SID of the device B based on the location of the SID of the device B in the segment list. The device A updates a destination address field in one replicated packet corresponding to the device A based on the SID of the device B. The first device obtains the packet corresponding to the device B based on an updated replicated packet.

In an embodiment, the packet further carries a first identifier, and the first identifier indicates a location of a SID of a current packet processing device in the segment list. After the device A updates the destination address field in the one replicated packet corresponding to the device A based on the SID of the device B, the device A further updates the first identifier of the replicated packet corresponding to the device A based on the SID of the device B.

For example, the device A reads the DA field to obtain the following information: There is a replication instruction. A start location and an end location that are of SIDs of next packet processing devices in the segment list are respectively 1 and 2. Based on the foregoing information, the device A learns that the packet needs to be replicated twice, and devices to which replicated packets need to be sent are devices indicated by the SIDs whose sequence numbers are respectively 1 and 2. The device A replicates the packet twice, locates a SID 1 and a SID 2 in the segment list, fills the SID 1 into a DA field of one replicated packet, and sets a first identifier (segment left) in the packet from 0 to 1. The SID 2 is filled into a DA field of another replicated packet, and a first identifier in the packet is set from 0 to 2.

10014: The device A sends a corresponding packet to the device B, and sends a corresponding packet to the device C.

The device A separately sends, based on locations in a network that are indicated by node addresses in DA fields, two replicated packets that carry different DA fields to corresponding devices, for example, the devices B and C.

Similarly, after receiving the packet sent by the device A, the device B also replicates the packet twice according to the foregoing method, correspondingly modifies the DA field and the first identifier, and then separately sends corresponding packets to devices, for example, nodes D and E, indicated by SIDs whose sequence numbers are 3 and 4. After receiving the packet sent by the node A, the device C also replicates the packet twice according to the foregoing method, correspondingly modifies the DA field and the first identifier, and then separately sends corresponding packets to devices, for example, devices F and G, indicated by SIDs whose sequence numbers are 5 and 6.

After a device D receives a packet that is corresponding to the device D and that is sent by the device B, the device D performs a function performed by the first device in the method shown in FIG. 2. Because the device D is an intermediate node and used as a first device on the transmission path shown in FIG. 10, a packet transmission method performed by the device D includes but is not limited to the following several steps.

10021: The device D obtains the packet corresponding to the device D, where the packet corresponding to the device D carries a destination address field and a node information list, and the destination address field includes a second part and a first part.

The device D directly receives the packet sent by the device B, and uses the packet as the packet corresponding to the device D.

10022: The device D determines node information of a device H from the node information list based on the first part.

The first part identifies a location of the node information of the device H in the node information list.

10023. The device D obtains a packet corresponding to the device H based on the packet corresponding to the device D.

After receiving the packet from device B, the device D reads the DA field to obtain the following information: There is a replication instruction. The device has only one next packet processing device, for example, a device indicated by a SID whose sequence number is 7. The device D replicates the packet once based on the foregoing information, and correspondingly modifies the DA field and a first identifier.

10024: The device D sends a corresponding packet to the device H.

The device D sends the packet to the device, namely, the device H, indicated by the SID whose sequence number is 7. Similarly, E, F, and G also replicate and update corresponding packets according to the packet processing method of the node D, and then send corresponding packets to the device H.

After receiving the packets respectively sent by D, E, F, and G, the device H reads DA fields, learns that the device is a last node on the packet transmission path, and does not replicate the packet, and completes transmission of the packet on the path. In an embodiment, because the device H is an egress node on the packet transmission path, the device H may further decapsulate the packet.

Figure 12:
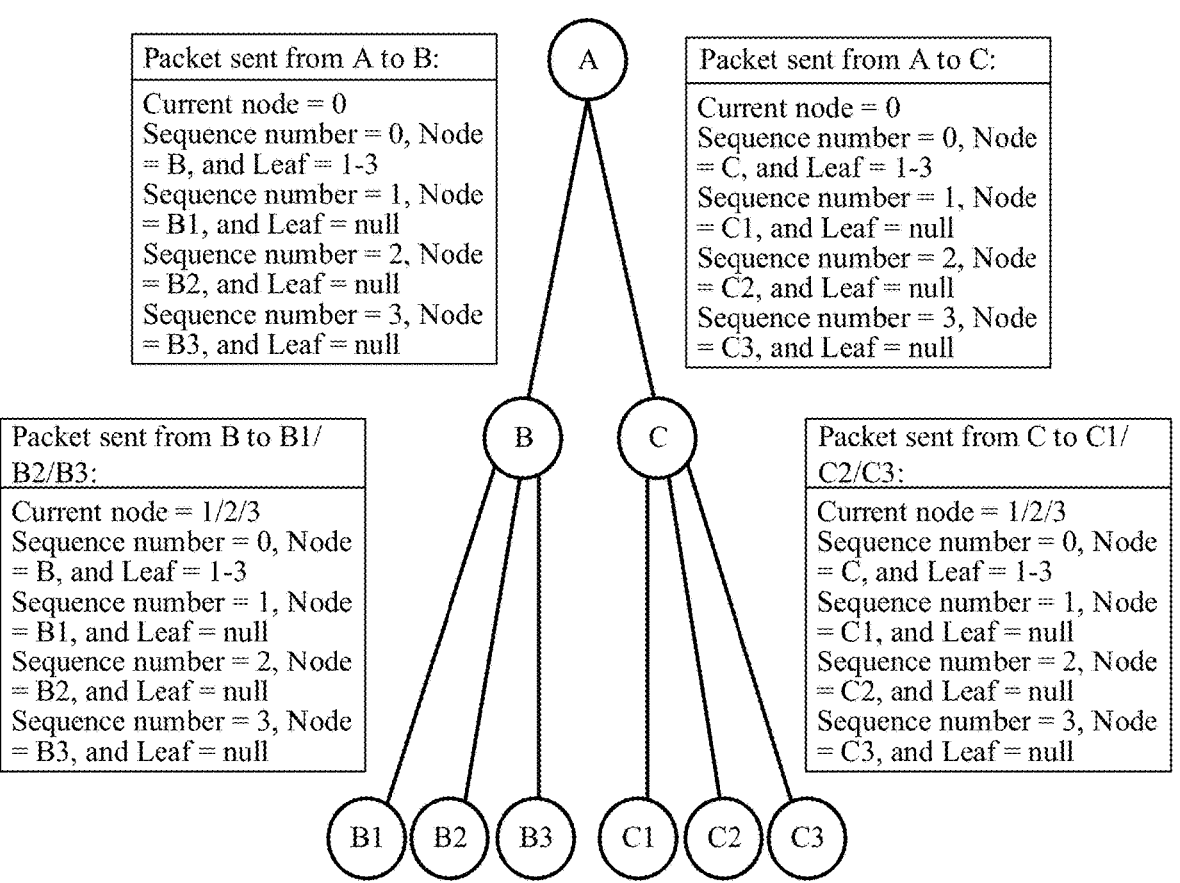
FIG. 12 is a schematic diagram of structures of packets transmitted by nodes in a network architecture according to an embodiment of this application.

FIG. 12 is a schematic diagram of structures of packets transmitted by nodes in a network architecture according to an embodiment of this application. A packet transmission path in this embodiment is the path shown in FIG. 7. In FIG. 12, a "node" in a second column of the packet represents a node address, and a "leaf" in a third column represents a node pointer. As shown in FIG. 12, in this embodiment, an ingress node device A is used as a first device, and a packet transmission method performed by the device A includes but is not limited to the following several steps.

12011: The device A obtains a packet corresponding to the device A, where the packet corresponding to the device A carries a destination address field and a node information list, and the destination address field includes a second part and a first part.

The device A first encapsulates a to-be-transmitted packet by using an SRH as an IPv6 extension header, and then fills a first SID (a SID 0) in a segment list into a destination address field of an encapsulated packet to obtain the packet corresponding to the device A.

12012: The device A determines node information of a device B and node information of a device C from the node information list based on the first part.

The first part identifies locations of the node information of the device B and the node information of the device C in the node information list.

12013: The device A obtains a packet corresponding to the device B and a packet corresponding to the device C based on the packet corresponding to the device A.

In an embodiment, the step in which the device A obtains the packet corresponding to the device B and the packet corresponding to the device C includes: The device A determines, based on the first part, a quantity of target devices including the device B and the device C. The device A replicates the packet corresponding to the device A for a quantity of times that is the same as the quantity of target devices. The device A determines a location of a SID of the device B in the segment list based on the first part, and obtains the SID of the device B based on the location of the SID of the device B in the segment list. The device A updates a destination address field in one replicated packet corresponding to the device A based on the SID of the device B. The device A obtains the packet corresponding to the device B based on an updated replicated packet. In an embodiment, the packet further carries a first identifier, and the first identifier indicates a location of a SID of a current packet processing device in the segment list. After the device A updates the destination address field in the one replicated packet corresponding to the device A based on the SID of the device B, the device A further updates the first identifier of the replicated packet corresponding to the device A based on the SID of the device B. Then, the device A obtains another updated packet based on a location of a SID of the device C in the segment list according to the same method.

The device A processes a SID in the another updated packet to obtain a processed packet. A node information list in the processed packet includes only a SID of a packet processing device that is located after the device A on the transmission path.

For example, the device A replicates the packet twice based on the first part in the destination address field of the packet corresponding to the device A, then locates SIDs of the device B and the device C in the segment list based on the first part, and separately updates destination address fields of two replicated packet based on the located SIDs. After the updated packet is obtained, the device A processes a segment list in the updated packet to obtain a processed packet, so that the segment list in the processed packet includes only node information of the packet processing device that is located after the device A on the transmission path.

For example, the device A modifies segment lists of the two updated packets separately. In a packet sent by the device A to the device B, a packet transmission path in a segment list includes a path starting from the device B to an egress node, and in a packet sent by the device A to the device C, a packet transmission path in a segment list includes a path starting from the device C to an egress node. Then, SIDs whose sequence numbers are 0 in modified packets are respectively filled into destination address fields of the packets, to form two packets sent to the devices B and C respectively.

12014: The device A sends a corresponding packet to the device B, and sends a corresponding packet to the device C.

The device A separately sends, based on location information indicated by node addresses in the DA fields, the two packets whose segment lists have been processed to corresponding devices, for example, the devices B and C.

It should be noted that, in this case, first identifiers of the two packets are both 0, indicating that the location of the SID of the current packet processing device is the first in the segment list. However, in the packet sent by the device A to the device B, a first identifier 0, for example, a SID whose sequence number is 0 in a modified segment list, indicates the device B. In the packet sent by A to C, a first identifier 0, for example, a SID whose sequence number is 0 in a modified segment list, indicates the device C.

After the device B receives the packet that is corresponding to the device B and that is sent by the device A, the device B performs a function performed by the first device in the method shown in FIG. 2. Because the device B is an intermediate node and used as a first device on the transmission path shown in FIG. 12, a packet transmission method performed by the device B includes but is not limited to the following several steps.

12021: The device B obtains the packet corresponding to the device B, where the packet corresponding to the device B carries a destination address field and a node information list, and the destination address field includes a second part and a first part.

The device B directly receives the packet sent by the device A, and uses the packet as the packet corresponding to the device B.

12022: The device B determines node information of devices B1 to B3 from the node information list based on the first part.

The first part identifies locations of the node information of the devices B1 to B3 in the node information list.

12023: The device B obtains packets respectively corresponding to the devices B1 to B3 based on the packet corresponding to the device B.

After receiving the packet sent by the device A, the device B reads the destination address field, and obtains a replication instruction, a quantity of next-hop packet processing devices, and a location of the next-hop device in a segment list. In this way, the device B replicates the packet three times, fills a SID 1, a SID 2, and a SID 3 into destination address fields of replicated packets respectively, and then correspondingly modifies first identifiers of the packets, to form three packets.

12024: The device B sends corresponding packets to the devices B1 to B3.

The device B sends the corresponding packets to the devices B1, B2, and B3 respectively. Similarly, after receiving the packet sent by the device A, the device C also replicates and updates the packet to form three packets, and then sends the three packets to devices C1, C2, and C3 respectively. The process is not described herein again.

After receiving a packet sent by the device B, the device B1 reads a destination address field, learns that the device B1 is an egress node on the packet transmission path, and stops replication to complete transmission of the packet on the path. Similarly, devices B2, B3, C1, C2, and C3 also learn that the devices B2, B3, C1, C2, and C3 are egress nodes on the packet transmission path, and complete transmission of the packet on the path.

FIG. 13 is a schematic diagram of structures of packets transmitted by nodes in a network architecture according to an embodiment of this application. A method according to this embodiment may be implemented based on any one of the foregoing packet transmission methods. This is not limited in this embodiment of this application. A packet transmission method in this example is implemented based on the method shown in FIG. 12. In FIG. 13, a "node" in a second column of the packet represents a node address, and a "leaf" in a third column represents a node pointer.

A packet transmission method performed by a device A is the same as that performed by the device A shown in FIG. 12. After a device B receives a packet that is corresponding to the device B and that is sent by the device A, the device B performs a function performed by the first device in the method shown in FIG. 2. Because the device B is an intermediate node and used as a first device on the transmission path shown in FIG. 12, a packet transmission method performed by the device B includes but is not limited to the following several steps.

13011: The device B obtains the packet corresponding to the device B, where the packet corresponding to the device B carries a destination address field and a node information list, and the destination address field includes a second part and a first part.

The device B directly receives the packet sent by the device A, and uses the packet as the packet corresponding to the device B.

13012: The device B determines node information of devices B1 to B3 from the node information list based on the first part.

The first part identifies locations of the node information of the devices B1 to B3 in the node information list.

13013: The device B obtains packets respectively corresponding to the devices B1 to B3 based on the packet corresponding to the device B.

The device B receives, based on the first part, the packet sent by the device A, and determines a quantity of target devices including the devices B1 to B3. The device B replicates the packet corresponding to the device B for a quantity of times that is the same as the quantity of target devices. The device B determines locations of the node information of the devices B1 to B3 in the node information list based on the first part, and obtains the node information of the device B1 based on the locations of the node information of the device B1 in the node information list. The device B updates a destination address field in one replicated packet corresponding to the device B based on node information of the device B1. The device B obtains a packet corresponding to the device B1 based on an updated replicated packet.

For example, the device B reads the destination address field, and obtains a replication instruction, a quantity of next packet processing devices, and a location of the next device in a segment list. In this way, the device B replicates the packet three times, fills a SID 1, a SID 2, and a SID 3 into destination address fields of replicated packets respectively, and then correspondingly modifies first identifiers of the packets, to form three packets.

In an embodiment, that the device B obtains the packet corresponding to the device B1 based on the updated replicated packet includes: popping up an internet protocol version 6 IPv6 extension header in the updated replicated packet based on that an updated first part in the updated replicated packet indicates that there is no packet processing device that is located after the device B1 on the transmission path, and using, after popping up the IPv6 extension header, a packet as the packet corresponding to the device B1.

For example, based on that a pointer carried in a destination address field of the updated packet indicates that there is no packet processing device after the device B, for example, next packet processing devices after the device B, namely, B1 to B3 are egress nodes on the packet transmission path, the device B pops up the IPv6 extension header of the updated packet, and uses the packet that does not carry the IPv6 extension header as the packets respectively corresponding to the devices B1 to B3.

13014: The device B sends corresponding packets to the devices B1 to B3.

The device B uses the packet that does not carry the IPv6 extension header as the packets respectively corresponding to the devices B1 to B3 and sends the packets to the devices B1 to B3 respectively. Similarly, after receiving a packet sent by the device A, a device C replicates the packet three times, and then performs, after separately replicating and updating packets, a packet processing method that is the same as that of the device B.

Next, the following example is provided for compressing a packet header by using a common prefix in the packet transmission method shown in FIG. 2, which includes but is not limited to the following three compression schemes.

Compression scheme 1: FIG. 14 is a schematic diagram of a compression encoding scheme used in a packet transmission method according to an embodiment of this application.

Compression encoding used in this embodiment of this application is used for header compression. For a large amount of repeated field information in a header, the common prefix can be used to reduce a size of the header. In this embodiment of this application, to reduce redundant information of the header, packet compression encoding by using the common prefix is introduced.

In node information of each packet processing device, "one common prefix+one node identifier" may be used to represent a node address. In this compression encoding scheme, only a node identifier needs to be carried and a complete node address does not need to be carried in the node information, so that a size of a node information list is reduced. In addition, the node information may further carry a function identifier and a node pointer. For example, in this example, the packet transmission path shown in FIG. 7 is used, and a used IPv6 extension header is an SRH. In this example, one common prefix is configured for SIDs of packet processing devices in a segment list. A length of the common prefix is 96 bits, a length of a node identifier is 16 bits, a length of a function identifier is 8 bits, and a length of a node pointer is 8 bits, where the node pointer includes a start location and an end location of next-hop packet processing devices, and the two fields each occupy 4 bits. In this encoding scheme in this example, a maximum quantity of node identifiers in a current network is 65535, a maximum quantity of SIDs in a packet is 15, and each device has a maximum of 15 next-hop packet processing devices.

For example, in this example, the common prefix configured for the SIDs of the packet processing devices is as follows: 2001:db8:3:4:5:6::/96. Node identifiers of A/B/C/B1/B2/B3/C1/C2/C3 are respectively A0/B0/C0/B1/B2/B3/C1/C2/C3. When a SID of each device is configured with 0xFE to represent a function identifier, a packet sent by a device A to a device B may be a packet shown in FIG. 14. "2001:db8:3:4:5:6:B0:FE35" in a destination address field of an IPv6 header indicates that a destination device is the device B, an instruction is replication, and a first part points to 3-5. In an SRH extension header, a first identifier is set to 1. "A0:FE12" in the segment list indicates a SID whose sequence number is 0 and the device A, and indicates that an instruction is replication, and a node pointer points to 1-2. "B0: FE35" indicates a SID whose sequence number is 1 and the device B, and indicates that an instruction is replication, and a node pointer points to 3-5. "C0: FE68" indicates a SID whose sequence number is 2 and a device C, and indicates that an instruction is replication, and a node pointer points to 6-8. "B1: FE00" indicates a SID whose sequence number is 3 and a device B1, and indicates that an instruction is replication, and a node pointer points to 0-0. "B2: FE00" indicates a SID whose sequence number is 4 and a device B2, and indicates that an instruction is replication, and a node pointer points to 0-0. "B3: FE00" indicates a SID whose sequence number is 5 and the device B3, and indicates that an instruction is replication, and a node pointer points to 0-0. "C1: FE00" indicates a SID whose sequence number is 6 and a device C1, and indicates that an instruction is replication, and a node pointer points to 0-0. "C2: FE00" indicates a SID whose sequence number is 7 and a device C2, and indicates that an instruction is replication, and a node pointer points to 0-0. "C3: FE00" indicates a SID whose sequence number is 8 and the device C3, and indicates that an instruction is replication, and a node pointer points to 0-0. It can be learned from the compression encoding scheme shown in FIG. 14 that, in the packet header compressed by using the common prefix, space of the node information list is reduced by half. In this way, the size of the packet is reduced, a response speed is increased, and transmission efficiency of the packet on the packet transmission path is improved.

Compression scheme 2: FIG. 15 is a schematic diagram of a compression encoding scheme used in a packet transmission method according to an embodiment of this application.

On a packet transmission path, some devices may be specified as intermediate nodes and egress nodes. In this case, the devices may be used as the intermediate nodes in network domain to connect to other router nodes, and may also be used as edge devices to connect to user devices such as user hosts. The devices that are used as intermediate nodes and egress nodes are referred to as composite nodes. For example, on the packet transmission path shown in FIG. 7, a device B is specified as a composite node. The device B may send a packet to B1/B2/B3, also replicate the packet once, and continue to send a replicated packet to an upper-layer device or performs decapsulation processing. In other words, in the packet transmission method according to this embodiment, there are two types of packet decapsulation nodes, one is the composite node, and the other is the egress node described above. The two types of packet decapsulation nodes are referred to as leaf nodes. In the method according to this embodiment of this application, whether a node is a leaf node is indicated by carrying a leaf identifier in node information of each device, in other words, whether the node needs to perform decapsulation is indicated by using the leaf identifier. After determining that a device is a leaf node, whether the node is a composite node or an egress node is further determined by using a first part. If the node is a composite node, a packet is replicated once, and a replicated packet is decapsulated. If the node is an egress node, the packet is directly decapsulated.

In an embodiment, two leaf identifiers may be allocated to node information of a device, which are respectively "node identifier+node used as a leaf node" and "node identifier+ node not used as a leaf node". In an embodiment, the two leaf identifiers are combined with a node address of the device to form two types of node addresses of the device. For example, in the foregoing compression encoding scheme, ::B001 and ::B002 are allocated to the device B, and respectively indicate "node B identifier+node B used as a leaf node" and "node B identifier+node B not used as a leaf node".

In an embodiment, alternatively, an independent leaf identifier may be allocated in node information of a device, and the leaf identifier uses two values to indicate "whether a current node is a leaf node". For example, in the compression encoding scheme, an encoding scheme of the node information is: A common prefix occupies 96 bits, a node identifier occupies 16 bits, a function identifier occupies 7 bits, a leaf identifier occupies 1 bit, and a start location and an end location of next packet processing devices in a node pointer each occupy 4 bits. If a value of the leaf identifier bit is "1", it indicates that the node is a leaf node. If the value of the leaf identifier bit is "0", it indicates that the node is not a leaf node.

For example, on the packet transmission path shown in FIG. 7, an IPv6 extension header is an SRH. A packet sent by a device A to the device B may be in a structure of a packet shown in FIG. 15. A common prefix of the packet is 2001:db8:3:4:5:6::/96. Node IDs of A/B/C/B1/B2/B3/C1/ C2/C3 are respectively A0/B0/C0/B1/B2/B3/C1/C2/C3. A function identifier 0xFE is configured for node information of each device to indicate a replication instruction. "2001: db8:3:4:5:6:B0:FF35" in a destination address field of an IPv6 header indicates that a destination node is the device B, an instruction is replication, a leaf identifier indicates that "the node is a leaf node", and a first part points to 3 to 5. Because the first part is not 0, the device B is a composite node, and needs to replicate the packet once for decapsulation. In an SRH extension header, a first identifier is set to 1. "A0: FE12" in a segment list indicates a SID whose sequence number is 0 and the device A, and indicates that an instruction is replication, a leaf identifier indicates that "the node is not a leaf node", and a first part points to 1-2. "B0: FF35" indicates a SID whose sequence number 1 and the device B, and indicates that an instruction is replication, a leaf identifier indicates that "the node is a leaf node", and a first part points to 3-5. Because the first part is not 0, the device B is a composite node. "C0: FE68" indicates a SID whose sequence number is 2 and a device C, and indicates that an instruction is replication, a leaf identifier indicates that "the node is not a leaf node", and a first part points to 6-8.

In addition, in the segment list, "B1:FF00" indicates a SID whose sequence number is 3 and a device B1, and indicates that an instruction is replication, a first part points to 0-0, and a leaf identifier indicates that "the node is a leaf node". Because the first part is 0, B1 is an egress node, and directly decapsulates the packet. "B2:FF00" indicates a SID whose sequence number is 4 and a device B2, and indicates that an instruction is replication, a first part points to 0-0, and a leaf identifier indicates that "the node is a leaf node". Because the first part is 0, B2 is an egress node. "B3:FF00" indicates a SID whose sequence number is 5 and a device B3, and indicates that an instruction is replication, a first part points to 0-0, and a leaf identifier indicates that "the node is a leaf node". Because the first part is 0, B3 is an egress node. "C1:FF00" indicates a SID whose sequence number is 6 and a node C1, and indicates that an instruction is replication, a first part points to 0-0, and a leaf identifier indicates that "the node is a leaf node". Because the first part is 0, C1 is an egress node. "C2:FF00" indicates a SID whose sequence number is 7 and a device C2, and indicates that an instruction is replication, a first part points to 0-0, and a leaf identifier indicates that "the node is a leaf node". Because the first part is 0, C2 is an egress node. "C3:FF00" indicates a SID whose sequence number is 8 and a device C3, and indicates that an instruction is replication, a first part points to 0-0, and a leaf identifier indicates that "the node is a leaf node". Because the first part is 0, C3 is an egress node.

A binary value of 0xFE is "1111,1110". The first seven bits are all "1", which indicates a replication function in this embodiment of this application. An eighth bit is 0, and a node is a leaf node, indicating that the node is not a composite node. A binary value of 0xFF is "1111,1111". The first seven bits are all "1", which indicates a replication function in this embodiment of this application. An eighth bit is 1, indicating that a node is a composite node. For example, the device B has 0xFF, and the first part also indicates that the device B has a next packet processing device. Therefore, the device B is a composite node. B1/B2/ B3/C1/C2/C3 have 0xFE, and first parts indicate that B1/B2/ B3/C1/C2/C3 do not have a next packet processing device. Therefore, B1/B2/B3/C1/C2/C3 are egress nodes.

Compression scheme 3: FIG. 16 is a schematic diagram of a compression encoding scheme used in a packet transmission method according to an embodiment of this application.

In this embodiment, a common prefix and a function identifier carried in node information of each packet processing device that are shown in FIG. 14 are combined as a common prefix in this embodiment. For example, a 96-bit common prefix and an 8-bit function identifier that are shown in FIG. 14 are combined into a 104-bit common prefix in this embodiment, so that an original function identifier does not need to occupy space of each piece of node information, and a size of a node information list is further reduced. For another example, a length of 96 bits is still configured for the common prefix, and the common prefix carries the function identifier, so that an original function identifier does not need to occupy space of each piece of node information. In this example, node information of each device further carries a leaf identifier and a node pointer. The leaf identifier occupies 8 bits, and the node pointer occupies 8 bits.

On the packet transmission path shown in FIG. 7, an IPv6 extension header is an SRH. A packet sent by a device A to a device B may be in the encoding scheme shown in FIG. 16. In this example, a common prefix configured for a SID of each device is as follows: 2001:db8:3:4:5:6. The common prefix also identifies a function of this embodiment, namely, an instruction to be executed. Node IDs of A/B/C/B1/B2/ B3/C1/C2/C3 are respectively A0/B0/C0/B1/B2/B3/C1/C2/ C3. In a destination address field of an IPv6 header, "2001:

db8:3:4:5:6:B0:0135" indicates that a destination node is the device B, an instruction is replication, the device is a leaf node, a first part points to 3-5, and the device is a composite node. In an SRH extension header, a current node identifier is set to 1. "A0: 0012" in an address list indicates a SID whose sequence number is 0 and the device A, and indicates that an instruction is replication, the node is not a leaf node, and a node pointer points to 1-2. "B0: 0135" indicates a SID whose sequence number is 1 and the device B, and indicates that an instruction is replication, the node is a leaf node, a node pointer points to 3-5, and the device is a composite device. "C0: 0068" indicates a SID whose sequence number is 2 and a device C, and indicates that an instruction is replication, the node is not a leaf node, and a node pointer points to 6-8. "B1: 0100" indicates a SID whose sequence number is 3 and a device B1, and indicates that an instruction is replication, the node is a leaf node, a node pointer points to 0-0, and the node is an egress node. "B2: 0100" indicates a SID whose sequence number is 4 and a device B2, and indicates that an instruction is replication, the node is a leaf node, a node pointer points to 0-0, and the node is an egress node. "B3: 0100" indicates a SID whose sequence number is 5 and a device B3, and indicates that an instruction is replication, the node is a leaf node, a node pointer points to 0-0, and the node is an egress node. "C1: FF00" indicates a SID whose sequence number is 6 and a device C1, and indicates that an instruction is replication, the node is a leaf node, a node pointer points to 0-0, and the node is an egress node. "C2: FF00" indicates a SID whose sequence number is 7 and a device C2, and indicates that an instruction is replication, the node is a leaf node, a node pointer points to 0-0, and the node is an egress node. "C3: FF00" indicates a SID whose sequence number is 8 and a device C3, and indicates that an instruction is replication, the node is a leaf node, a node pointer points to 0-0, and the node is an egress node.

In an embodiment, each packet processing device further obtains a forwarding information base (FIB), where the FIB includes a composition structure of a 128-bit IPv6 address: A common prefix "2001:db8:3:4:5:6" indicates a same part of node addresses of packet processing devices on the packet transmission path and a replication and forwarding function, and has a length of 96 bits. A node identifier has a length of 16 bits, and is combined with the same part in the common prefix to form a complete node address, which indicates a location of a device in a network. A leaf identifier has a length of 8 bits, and identifies whether the node is a leaf node. Lengths of a start location and an end location that are of SIDs of next packet processing devices in a segment list each are 4 bits. After receiving a packet, each device reads a destination address field, queries the foregoing information based on the FIB, and then correspondingly replicates, updates, and transmits the packet.

Figure 17:
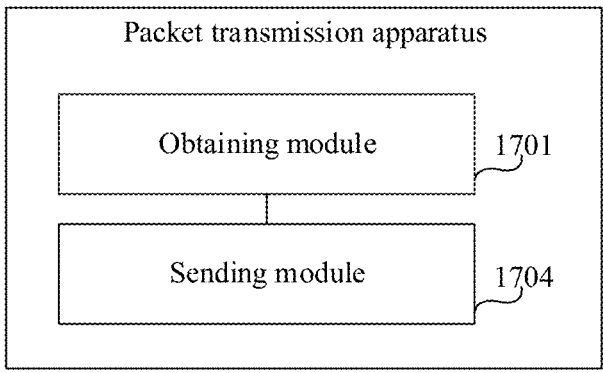
FIG. 17 is a schematic diagram of a structure of a packet transmission apparatus according to an embodiment of this application.

FIG. 17 shows a packet transmission apparatus according to an embodiment of this application. Based on a plurality of modules shown in FIG. 17 below, the packet transmission apparatus shown in FIG. 17 can perform all or a part of operations performed by the first device in the packet transmission method shown in FIGS. 2 to 16. It should be understood that the apparatus may include more additional modules than the shown modules or omit some of the shown modules. This is not limited in this embodiment of this application. The apparatus according to this embodiment of this application is used in a first device, and includes: an obtaining module 1701 and a sending module 1704.

In an embodiment, the obtaining module 1701 is configured to obtain a first packet. The first packet carries a destination address field and a node information list. The node information list includes node information of a second device and node information of a third device. The second device and the third device are next packet processing devices that are located after the first device on a transmission path of the first packet. The destination address field includes a first part and a second part. The second part indicates a location of the first device in a network. The first part indicates locations of the node information of the second device and the third device in the node information list. Node information of any device of the second device and the third device includes a node address and a node pointer. The node address indicates a location of the any device in the network. The node pointer indicates a location, in the node information list, of node information of a next packet processing device that is located after the any device on the transmission path.

In an embodiment, the obtaining module 1701 is configured to determine the node information of the second device and the node information of the third device from the node information list based on the first part, where the first part identifies locations of the node information of the second device and the node information of the third device in the node information list.

In an embodiment, the obtaining module 1701 is further configured to generate a second packet and a third packet based on the first packet, where the second packet includes the node information of the second device, and the third packet includes the node information of the third device.

In an embodiment, the sending module 1704 is configured to send the second packet to the second device, and send the third packet to the third device.

In an embodiment, the first part includes a start location and an end location of the node information of the second device and the node information of the third device in the node information list, where a location of the node information of the second device in the node information list is the start location, and a location of the node information of the third device in the node information list is the end location. Alternatively, the first part indicates a start location of the node information of the second device in the node information list and indicates an offset of a location of the third device in the node information list relative to a location of the second device in the node information list.

In an embodiment, the obtaining module 1701 is configured to replicate the first packet based on the first part to obtain a fourth packet; and add the node information of the second device to the fourth packet to obtain the second packet.

In an embodiment, the obtaining module 1701 is configured to determine, based on the first part, a quantity of target devices including the second device and the third device; replicate the first packet for a quantity of times that is equal to the quantity of target devices; and obtain the second packet based on the node information of the second device, where the second packet carries an updated second part and an updated first part, the updated second part indicates a location of the second device in the network, and the updated first part indicates a location, in the node information list, of node information of a next packet processing device after the second device on the transmission path.

In an embodiment, the obtaining module 1701 is configured to determine the location of the second device in the node information list based on the first part, and obtain the node information of the second device based on the location of the second device in the node information list; update a destination address field in one fourth packet based on the node information of the second device; and obtain the second packet based on an updated fourth packet.

In an embodiment, the obtaining module 1701 is configured to use the updated fourth packet as the second packet; or pop up an internet protocol version 6 IPv6 extension header in the updated fourth packet based on that an updated first part in the updated fourth packet indicates that there is no packet processing device that is located after the second device on the transmission path, and use a packet as the second packet after popping up the IPv6 extension header.

In an embodiment, the obtaining module 1701 is configured to process a node information list in the updated fourth packet to obtain a processed packet, where the node information list in the processed packet includes only information about a packet processing node that is located after the first device on the transmission path; and use the processed packet as the second packet, or pop up an IPv6 extension header in the processed packet based on that an updated first part in the processed packet indicates that there is no packet processing device that is located after the second device on the transmission path, and use a packet as the second packet after popping up the IPv6 extension header.

In an embodiment, the first device is an ingress node on the transmission path of the first packet. The obtaining module 1701 is configured to obtain a fifth packet, and add the second part, the first part, and the node information list to the fifth packet to obtain the first packet, where the node information list further includes node information of the first device, and the second part and the first part are obtained based on the node information of the first device.

For example, the first packet is an SRv6 packet, the node information list is carried in a segment routing header SRH of the SRv6 packet, and the node information list is a segment list of the SRH. Alternatively, the first packet is an IPv6 packet, the node information list is carried in a routing header RH of the IPv6 packet, and the node information list is a segment list of the RH. Alternatively, the first packet is an IPv6 packet, the node information list is carried in a destination options header DOH of the IPv6 packet, and the node information list is an address list of the DOH.

In an embodiment, the first packet, the second packet, and the third packet each further carry a first identifier, and the first identifier indicates a location of node information of a current packet processing device in the node information list.

Figure 18:
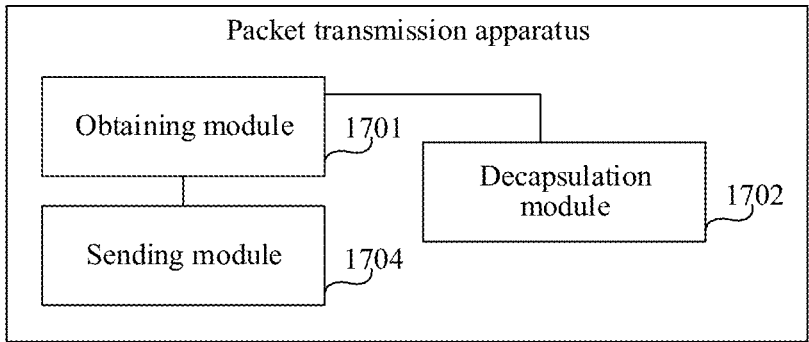
FIG. 18 is a schematic diagram of a structure of a packet transmission apparatus according to an embodiment of this application.

In an embodiment, the first packet further carries a leaf identifier, the leaf identifier indicates whether the first device is a leaf node, and the leaf node is a device that needs to decapsulate the first packet. FIG. 18 shows a packet transmission apparatus according to an embodiment of this application. Based on the apparatus shown in FIG. 17, the apparatus according to this embodiment of this application further includes: a decapsulation module 1702. The decapsulation module 1702 is configured to replicate the first packet at least once to obtain a fourth packet, and decapsulate the fourth packet based on that a leaf identifier carried in a first packet indicates that a first device is a leaf node and a first part indicates that there is a packet processing device that is located after the first device on a transmission path. Alternatively, the decapsulation module 1702 decapsulates the first packet based on that the leaf identifier carried in the first packet indicates that the first device is a leaf node and the first part indicates that there is no packet processing device that is located after the first device on the transmission path.

For example, two identifiers are configured for the first device, one of the two leaf identifiers indicates that the first device is a leaf node, and the other leaf identifier indicates that the first device is not a leaf node. The first packet carries one of the two leaf identifiers. Alternatively, one leaf identifier is configured for the first device, the leaf identifier has a first value and a second value, the first value indicates that the first device is a leaf node, the second value indicates that the first device is not a leaf node, and a value of the leaf identifier carried in the first packet is the first value or the second value.

In an embodiment, a second part includes a common prefix and a node identifier, the common prefix includes a same part of node addresses in node information of packet processing devices on the transmission path, and the node identifier indicates a different part of the node addresses in the node information of the packet processing devices on the transmission path. The common prefix further includes a same function identifier of the packet processing devices on the transmission path. The function identifier indicates a function to be performed by each device.

Figure 19:
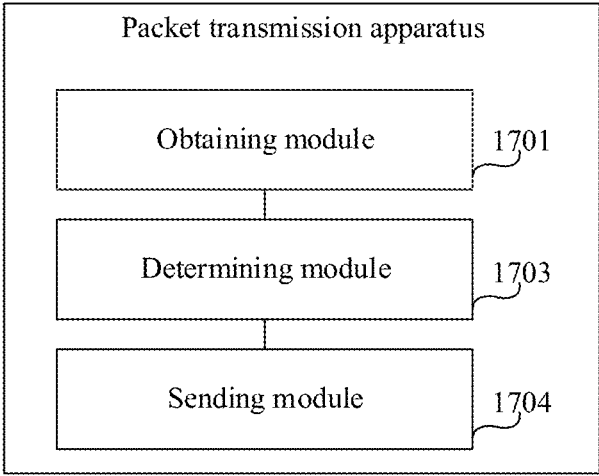
FIG. 19 is a schematic diagram of a structure of a packet transmission apparatus according to an embodiment of this application.

In an embodiment, the first device is an intermediate node on the transmission path of the first packet. FIG. 19 shows a packet transmission apparatus according to an embodiment of this application. Based on the apparatus shown in FIG. 17, the apparatus according to this embodiment of this application further includes: a determining module 1703. In an embodiment, the determining module 1703 is configured to determine, before the obtaining module 1701 obtains a second packet corresponding to a second device and a third packet corresponding to a third device based on a first part and a node information list, that a second part carried in a first packet is an address of a first device in a network, that is, the second part matches the address of the first device. In an embodiment, the sending module 1704 is further configured to: before the obtaining module 1701 obtains, based on the first part and the node information list, the second packet corresponding to the second device and the third packet corresponding to the third device, determine, based on the determining module 1703, that the second part of the first packet is not the address of the first device in the network, and forward the first packet based on the second part carried in the first packet.

It should be understood that, when the apparatuses provided in FIGS. 17 to 19 implement functions of the apparatuses, division into the foregoing functional modules is merely used as an example for description. During actual application, the foregoing functions may be allocated to different functional modules for implementation based on a requirement. In other words, a device is divided into different functional modules in terms of an inner structure, to implement all or some of the functions described above. In addition, the apparatuses provided in the foregoing embodiments and the method embodiments pertain to a same concept. For an embodiment of the apparatuses, refer to the method embodiments. Details are not described herein again.

Figure 20:
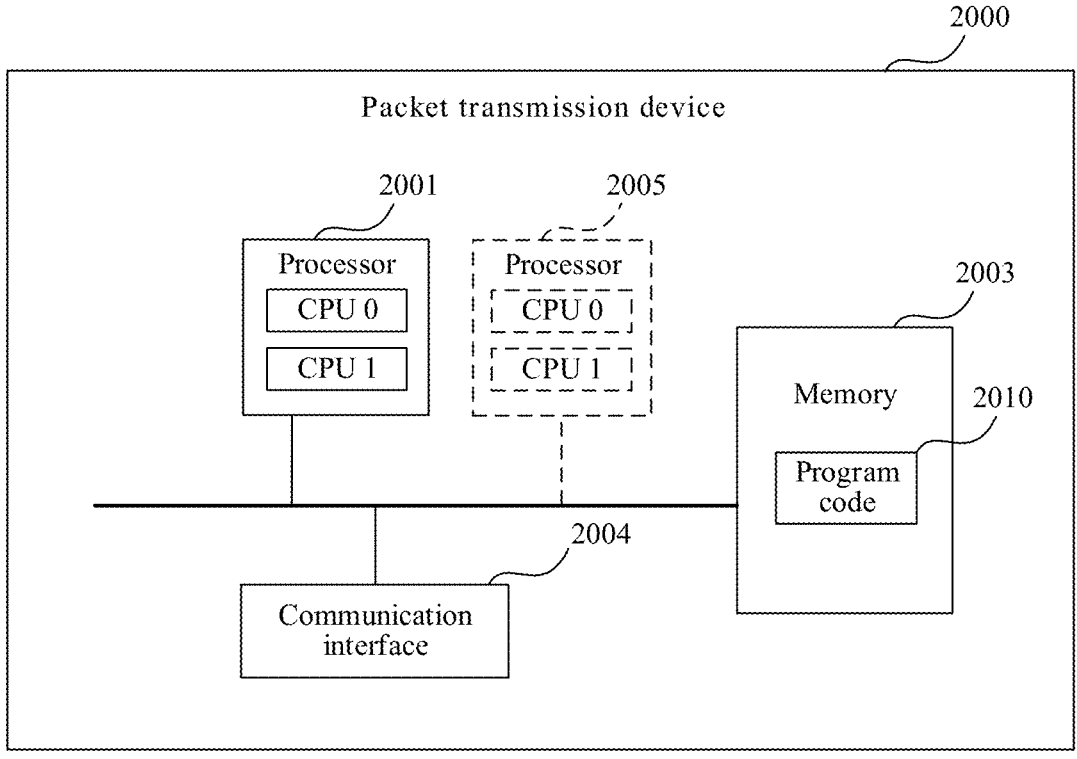
FIG. 20 is a schematic diagram of a structure of a packet transmission device according to an embodiment of this application.

FIG. 20 is a schematic diagram of a structure of a packet transmission device 2000 according to an example embodiment of this application. The packet transmission device 2000 shown in FIG. 20 may be configured to perform operations related to the first device in the packet transmission method shown in FIGS. 2 to 16. The packet transmission device 2000 is, for example, a switch or a router, and the packet transmission device 2000 may be implemented by using a general bus architecture.

As shown in FIG. 20, the packet transmission device 2000 includes at least one processor 2001, a memory 2003, and at least one communication interface 2004.

The processor 2001 is, for example, a general-purpose central processing unit (CPU), a digital signal processor (DSP), a network processor (NP), a graphics processing unit (GPU), a neural network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field programmable gate array (FPGA), generic array logic (GAL), or any combination thereof. The processor 2001 may implement or execute various logical blocks, modules, and circuits described with reference to content disclosed in embodiments of the present invention. Alternatively, the processor may be a combination of processors implementing a computing function, for example, a combination of one or more microprocessors, or a combination of a DSP and a microprocessor.

In an embodiment, the packet transmission device 2000 further includes a bus. The bus is configured to transmit information between components of the packet transmission device 2000. The bus may be a peripheral component interconnect (PCI for short) bus, an extended industry standard architecture (EISA for short) bus, or the like. Buses may be classified into an address bus, a data bus, a control bus, and the like. For ease of representation, only one bold line is used for representation in FIG. 20, but this does not mean that there is only one bus or only one type of bus.

The memory 2003 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. For example, the memory 2003 exists independently, and is connected to the processor 2001 by using the bus. Alternatively, the memory 2003 and the processor 2001 may be integrated together.

The communication interface 2004 is configured to communicate with another device or a communication network by using any transceiver-type apparatus. The communication network may be the ethernet, a radio access network (RAN), a wireless local area network (WLAN), or the like. The communication interface 2004 may include a wired communication interface, and may further include a wireless communication interface. In an embodiment, the communication interface 2004 may be an ethernet interface, a fast ethernet (FE) interface, a gigabit ethernet (GE) interface, an asynchronous transfer mode (ATM) interface, a wireless local area network (WLAN) interface, a cellular network communication interface, or a combination thereof. The ethernet interface may be an optical interface, an electrical interface, or a combination thereof. In this embodiment of this application, the communication interface 2004 may be used by the packet transmission device 2000 to communicate with another device.

In an embodiment, the processor 2001 may include one or more CPUs, for example, a CPU 0 and a CPU 1 shown in FIG. 20. Each of the processors may be a single-core processor (single-CPU), or may be a multi-core processor (multi-CPU). The processor herein may be one or more devices, circuits, and/or processing cores configured to process data (for example, computer program instructions).

In an embodiment, the packet transmission device 2000 may include a plurality of processors, for example, the processor 2001 and the processor 2005 shown in FIG. 20. Each of the processors may be a single-core processor (single-CPU) or a multi-core processor (multi-CPU). The processor herein may be one or more devices, circuits, and/or processing cores configured to process data (for example, computer program instructions).

In an embodiment, the packet transmission device 2000 may further include an output device and an input device. The output device communicates with the processor 2001, and may display information in a plurality of manners. For example, the output device may be a liquid crystal display (LCD), a light emitting diode (LED) display device, a cathode ray tube (CRT) display device, a projector (projector), or the like. The input device communicates with the processor 2001, and may receive an input by a user in a plurality of manners. For example, the input device may be a mouse, a keyboard, a touchscreen device, a sensing device, or the like.

In some embodiments, the memory 2003 is configured to store program code 2010 for executing the solutions of this application, and the processor 2001 may execute the program code 2010 stored in the memory 2003. In other words, the packet transmission device 2000 may implement, by using the processor 2001 and the program code 2010 in the memory 2003, the packet transmission method provided in the method embodiments. The program code 2010 may include one or more software modules. In an embodiment, the processor 2001 may also store program code or instructions for executing the solutions of this application.

In an embodiment, the packet transmission device 2000 in this embodiment of this application may correspond to the first device in the foregoing packet transmission method embodiments. The processor 2001 in the packet transmission device 2000 reads instructions in the memory 2003, so that the packet transmission device 2000 shown in FIG. 20 can perform all or some operations performed by the first device.

In an embodiment, the processor 2001 is configured to send a second packet to a second device by using the communication interface, where the second packet includes an updated first part and a node address list, and the updated first part indicates, in the node address list, a location of a next device that is of the second device and that processes the packet. For brevity, other embodiments are not described herein again.

For another example, the packet transmission device 2000 in this embodiment of this application may correspond to the second device in the foregoing method embodiments. The processor 2001 in the packet transmission device 2000 reads instructions in the memory 2003, so that the packet transmission device 2000 shown in FIG. 20 can perform all or some operations performed by the second device.

In an embodiment, the processor 2001 is configured to receive, by using the communication interface, a second packet sent by a first device to the second device, where the second packet includes an updated first part and a node address list, and the updated first part indicates, in the node address list, a location of a next device that is of the second device and that processes the packet. For brevity, other embodiments are not described herein again.

The packet transmission device 2000 may further correspond to the packet transmission apparatus shown in FIGS. 17 to 19, and each functional module in the packet transmission apparatus is implemented by using software of the packet transmission device 2000. In other words, the functional modules included in the packet transmission apparatus are generated after the processor 2001 of the packet transmission device 2000 reads the program code 2010 stored in the memory 2003.

The steps of the packet transmission method shown in FIGS. 2 to 16 are completed by using an integrated logic circuit of hardware in the processor of the packet transmission device 2000 or instructions in a form of software. The steps of the methods disclosed with reference to embodiments of this application may be directly performed by a hardware processor, or may be performed by using a combination of hardware in the processor and a software module. The software module may be located in a mature storage medium, such as a random access memory, a flash memory, a read-only memory, a programmable read-only memory, an electrically erasable programmable memory, or a register, in the art. The storage medium is located in the memory, and the processor reads information in the memory and completes the steps in the foregoing methods in combination with the hardware in the processor. To avoid repetition, details are not described herein again.

Figure 21:
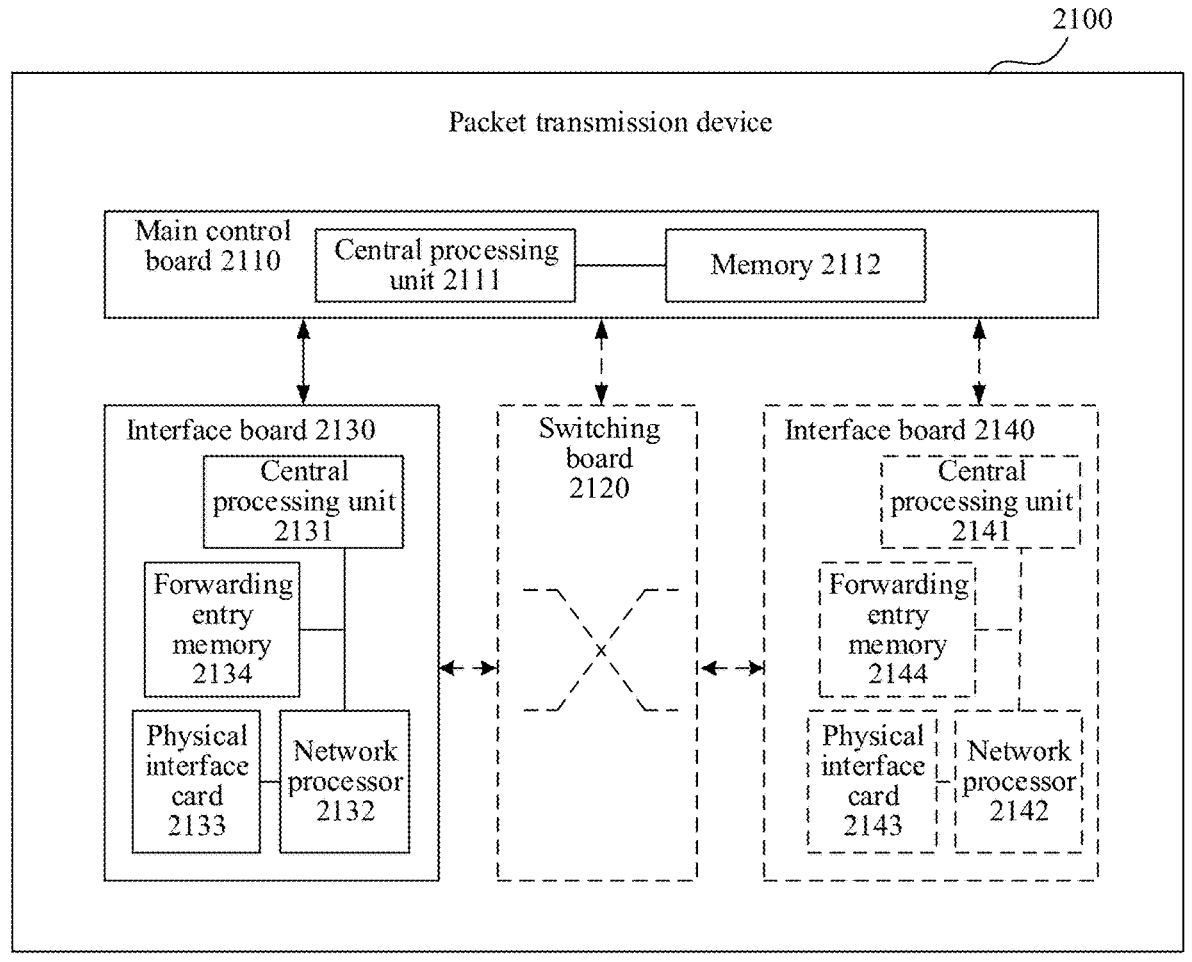
FIG. 21 is a schematic diagram of a structure of a packet transmission device according to an embodiment of this application.

FIG. 21 is a schematic diagram of a structure of a packet transmission device 2100 according to another example embodiment of this application. The packet transmission device 2100 shown in FIG. 21 is configured to perform all or some operations in the packet transmission method shown in FIGS. 2 to 16. The packet transmission device 2100 is, for example, a switch or a router, and the packet transmission device 2100 may be implemented by using a general bus architecture.

As shown in FIG. 21, the packet transmission device 2100 includes: a main control board 2110 and an interface board 2130.

The main control board is also referred to as a main processing unit (MPU) or a route processor card. The main control board 2110 is configured to control and manage components in the packet transmission device 2100, including route computation, device management, device maintenance, and a protocol processing function. The main control board 2110 includes: a central processing unit 2111 and a memory 2112.

The interface board 2130 is also referred to as a line processing unit (LPU), a line card, or a service board. The interface board 2130 is configured to provide various service interfaces, and forward a data packet. The service interface includes but is not limited to an ethernet interface, a POS (packet over SONET/SDH) interface, and the like. The ethernet interface is, for example, a flexible ethernet service interface (FlexE Clients). The interface board 2130 includes: a central processing unit 2131, a network processor 2132, a forwarding entry memory 2134, and a physical interface card (PIC) 2133.

The central processing unit 2131 on the interface board 2130 is configured to control and manage the interface board 2130 and communicate with the central processing unit 2111 on the main control board 2110.

The network processor 2132 is configured to implement packet forwarding processing. A form of the network processor 2132 may be a forwarding chip. The forwarding chip may be a network processor (NP). In some embodiments, the forwarding chip may be implemented by using an application-specific integrated circuit (ASIC) or a field programmable gate array (FPGA). In an embodiment, the network processor 2132 is configured to forward a received packet based on a forwarding table stored in the forwarding entry memory 2134. If a destination address field of the packet is an address of the packet transmission device 2100, the network processor 2132 continues to send the packet to an upper-layer device for processing by a CPU (for example, a central processing unit 2131). If the destination address field of the packet is not the address of the packet transmission device 2100, the network processor 2132 finds, based on the destination address field, a next hop and an outbound interface that correspond to the destination address field in the forwarding table, and forwards the packet to the outbound interface corresponding to the destination address field. Processing an uplink packet may include: processing the packet by using an inbound interface and searching the forwarding table. Processing a downlink packet may include: searching the forwarding table, and the like. In some embodiments, the central processing unit may also perform a function of the forwarding chip, for example, implement software forwarding based on a general-purpose CPU, so that the interface board does not need the forwarding chip.

The physical interface card 2133 is configured to implement a physical layer interconnection function. Original traffic enters the interface board 2130 from the physical interface card 2133, and a processed packet is sent out from the physical interface card 2133. The physical interface card 2133 is also referred to as a subcard and may be installed on the interface board 2130, and is responsible for converting an optical/electrical signal into a packet, performing validity check on the packet, and then forwarding the packet to the network processor 2132 for processing. In some embodiments, the central processing unit 2131 may alternatively perform a function of the network processor 2132, for example, implement software forwarding based on a general-purpose CPU, so that the physical interface card 2133 does not need the network processor 2132.

In an embodiment, the packet transmission device 2100 includes a plurality of interface boards. For example, the packet transmission device 2100 further includes an interface board 2140, and the interface board 2140 includes: a central processing unit 2141, a network processor 2142, a forwarding entry memory 2144, and a physical interface card 2143. Functions and implementations of components in the interface board 2140 are the same as or similar to those of the interface board 2130, and details are not described herein again.

In an embodiment, the packet transmission device 2100 further includes a switching board 2120. The switching board 2120 may also be referred to as a switch fabric unit (SFU). When the packet transmission device has a plurality of interface boards, the switching board 2120 is configured to complete data exchange between the interface boards. For example, the interface board 2130 and the interface board 2140 may communicate with each other via the switching board 2120.

The main control board 2110 is coupled to the interface board. For example, the main control board 2110, the interface board 2130, the interface board 2140, and the switching board 2120 are connected to a system backboard by using a system bus for interworking. In an embodiment, inter-process communication (IPC) channels are established between the main control board 2110 and the interface board 2130 and between the main control board 2110 and the interface board 2140, and communication between the main control board 2110 and the interface board 2130 and between the main control board 2110 and the interface board 2140 is performed through the IPC channels.

Logically, the packet transmission device 2100 includes a control plane and a forwarding plane. The control plane includes the main control board 2110 and the central processing unit 2111. The forwarding plane includes components, for example, the forwarding entry memory 2134, the physical interface card 2133, and the network processor 2132, used for forwarding. The control plane performs the following functions: a function of a router, generating a forwarding table, processing signaling and a protocol packet, configuring and maintaining a network device status, and the like. The control plane delivers the generated forwarding table to the forwarding plane. On the forwarding plane, the network processor 2132 searches the forwarding table delivered by the control plane, and then forwards, based on the table, a packet received by the physical interface card 2133. The forwarding table delivered by the control plane may be stored in the forwarding entry memory 2134. In some embodiments, the control plane and the forwarding plane may be totally separated, and are not on a same network device.

It should be noted that, there may be one or more main control boards. When there are a plurality of main control boards, the main control boards may include an active main control board and a standby main control board. There may be one or more interface boards. A packet transmission device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the packet transmission device may not need the switching board, and the interface board provides a function of processing service data in an entire system. In a distributed forwarding architecture, the packet transmission device may have at least one switching board, and data exchange between a plurality of interface boards is implemented by using the switching board, to provide a large-capacity data exchange and processing capability. Therefore, a data access and processing capability of a packet transmission device in the distributed architecture is better than that of a packet transmission device in the centralized architecture. In an embodiment, the packet transmission device may alternatively be in a form in which there is only one card. In an embodiment, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The packet transmission device in this form (for example, a network device such as a low-end switch or router) has a weak data exchange and processing capability. A specific architecture that is to be used depends on a specific networking deployment scenario. This is not limited herein.

In an embodiment, the packet transmission device 2100 corresponds to the packet transmission apparatus used in the first device shown in FIG. 17. In some embodiments, the obtaining module 1701 and the sending module 1704 in the packet transmission apparatus shown in FIG. 17 are equivalent to the physical interface card 2133 in the packet transmission device 2100.

In some embodiments, the packet transmission device 2100 further corresponds to the packet transmission apparatus used in the first device shown in FIG. 18. In some embodiments, the obtaining module 1701 and the sending module 1704 in the packet transmission apparatus shown in FIG. 18 are equivalent to the physical interface card 2133 in the packet transmission device 2100. The decapsulation module 1702 is equivalent to the central processing unit 2111 or the network processor 2132 in the packet transmission device 2100.

In some embodiments, the packet transmission device 2100 further corresponds to the packet transmission apparatus used in the first device shown in FIG. 19. In some embodiments, the obtaining module 1701 and the sending module 1704 in the packet transmission apparatus shown in FIG. 19 are equivalent to the physical interface card 2133 in the packet transmission device 2100. The decapsulation module 1702 is equivalent to the central processing unit 2111 or the network processor 2132 in the packet transmission device 2100.

Based on the packet transmission devices shown in FIG. 20 and FIG. 21, an embodiment of this application further provides a packet transmission system. The system includes: a first device and a second device. In an embodiment, the first device is the packet transmission device 2000 shown in FIG. 20 or the packet transmission device 2100 shown in FIG. 21, and the second device is the packet transmission device 2000 shown in FIG. 20 or the packet transmission device 2100 shown in FIG. 21.

For a packet transmission method performed by the first device and the second device, refer to related descriptions of the first device and the second device in the embodiments shown in FIGS. 2 to 16. Details are not described herein again.

An embodiment of this application further provides a communication apparatus. The apparatus includes: a transceiver, a memory, and a processor. The transceiver, the memory, and the processor communicate with each other by using an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform the packet transmission method that needs to be performed by the first device.

An embodiment of this application further provides a communication apparatus. The apparatus includes: a transceiver, a memory, and a processor. The transceiver, the memory, and the processor communicate with each other by using an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform the packet transmission method that needs to be performed by the second device.

It should be understood that the processor may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor or any conventional processor or the like. It should be noted that the processor may be a processor that supports an advanced reduced instruction set computing machines (ARM) architecture.

Further, in an optional embodiment, the memory may include a read-only memory and a random access memory, and provide instructions and data for the processor. The memory may further include a non-volatile random access memory. For example, the memory may further store information of a device type.

The memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

An embodiment of this application further provides a computer-readable storage medium. The storage medium stores at least one instruction, and the instruction is loaded and executed by a processor to implement any one of the foregoing packet transmission methods.

An embodiment of this application further provides a computer program (product). When the computer program is executed by a computer, a processor or the computer may be enabled to perform corresponding steps and/or procedures of the packet transmission method in the foregoing method embodiments.

An embodiment of this application further provides a chip, including a processor, configured to invoke, from a memory, instructions stored in the memory and run the instructions, to enable a communication device on which the chip is installed to perform the packet transmission methods in the foregoing aspects.

An embodiment of this application further provides another chip, including: an input interface, an output interface, a processor, and a memory. The input interface, the output interface, the processor, and the memory are connected by using an internal connection path. The processor is configured to execute code in the memory. When the code is executed, the processor is configured to perform the packet transmission methods in the foregoing aspects.

All or some of the foregoing embodiments may be implemented by using software, hardware, firmware, or any combination thereof. When software is used to implement the embodiments, a part or all of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (a DVD), a semiconductor medium (for example, a solid-state disk solid-state disk), or the like.

A person of ordinary skill in the art may be aware that, with reference to the method steps and the modules described in embodiments disclosed in this specification, implementation can be performed by using software, hardware, firmware, or a combination thereof. To clearly describe the interchangeability between the hardware and the software, the foregoing has generally described steps and composition of each embodiment based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

When software is used to implement the embodiments, a part or all of the embodiments may be implemented in a form of a computer program product. The computer program product includes one or more computer program instructions. For example, the method in embodiments of this application may be described in a context of machine-executable instructions. The machine-executable instructions are, for example, a program module executed in a device included in a real or virtual processor of a target. Usually, the program module includes a routine, a program, a library, an object, a class, a component, a data structure, and the like, and executes a specific task or implements a specific abstract data structure. In various embodiments, functions of program modules may be combined or split between the described program modules. The machine-executable instructions used for the program module may be executed locally or within a distributed device. In the distributed device, the program module may be located in both a local storage medium and a remote storage medium.

Computer program code used to implement the methods in embodiments of this application may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server.

In a context of embodiments of this application, the computer program code or related data may be carried by any appropriate carrier, so that a device, an apparatus, or a processor can perform various processing and operations described above. Examples of the carrier include a signal, a computer-readable medium, and the like.

Examples of the signal may include propagating signals in electrical, optical, radio, sound, or other forms, such as a carrier and an infrared signal.

A machine-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

It may be clearly understood by a person skilled in the art that, for the purpose of convenient and brief description, for a detailed working process of the foregoing system, device, and module, refer to a corresponding process in the foregoing method embodiments. Details are not described herein.

In the several embodiments provided in this application, it should be understood that the disclosed system, device, and method may be implemented in other manners. For example, the described device embodiment is merely an example. For example, division into the modules is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented through some interfaces. Indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in embodiments of this application.

In addition, functional modules in embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for indicating a computer device (which may be a personal computer, a server, or a network device) to perform all or some of the steps of the methods described in embodiments of this application. The foregoing storage medium includes: any medium, such as a USB flash drive, a removable hard disk, a read-only memory (ROM), a random access memory (RAM), a magnetic disk, or an optical disc, that can store program code.

In this application, terms "first", "second", and the like are used to distinguish between same or similar items whose effects and functions are basically the same. It should be understood that there is no logical or time-sequence dependency between "first", "second", and "$n^{th}$", and a quantity and an execution sequence are not limited. It should be further understood that although the terms such as "first" and "second" are used in the following descriptions to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

In this application, the term "at least one" means one or more, and the term "a plurality of" means two or more. For example, a plurality of second packets mean two or more second packets. The terms "system" and "network" may be used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between the associated objects.

It should be further understood that the term "include" (or referred to as "includes", "including", "comprises", and/or "comprising"), when being used in this specification, specifies the presence of stated features, integers, steps, operations, elements, and/or components, but do not preclude the presence or addition of one or more other features, integers, steps, operations, elements, components, and/or groups thereof.

It should be further understood that the term "if" may be interpreted as a meaning of "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (the stated condition or event) is detected" or "in response to detecting (the stated condition or event)".

It should be understood that determining B based on A does not mean that B is determined based on only A, and B may alternatively be determined based on A and/or other information.

It should be further understood that "one embodiment", "an embodiment", or "a possible implementation" mentioned throughout this specification means that particular features, structures, or characteristics related to the embodiment or implementation are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A method of packet transmission, comprising:

obtaining, by a first device, a first packet comprising a destination address field and a node information list, wherein the node information list comprises node information of a second device and node information of a third device, and the destination address field comprises a first part;

determining, by the first device, the node information of the second device and the node information of the third device from the node information list based on the first part, wherein the first part identifies a location of the node information of the second device and a location of the node information of the third device in the node information list;

generating, by the first device, a second packet and a third packet based on the first packet, wherein the second packet comprises the node information of the second device, and the third packet comprises the node information of the third device; and sending, by the first device, the second packet to the second device, and sending the third packet to the third device.

2. The method according to claim 1, wherein the location of the node information of the second device in the node information list is a start location, and the location of the node information of the third device in the node information list is an end location; or the location of the node information of the second device in the node information list is the start location, and the first part further identifies an offset of the location of the node information of the third device in the node information list relative to the location of the node information of the second device in the node information list.

3. The method according to claim 1, wherein generating the second packet comprises:

replicating, by the first device, the first packet based on the first part to obtain a fourth packet; and adding, by the first device, the node information of the second device to the fourth packet to obtain the second packet.

4. The method according to claim 1, wherein the first device is an ingress node on a transmission path of the first packet; and obtaining the first packet comprises:

receiving, by the first device, a fifth packet, and adding the first part and a second part of the destination address field of the first packet to a destination address field of the fifth packet, to obtain the first packet, wherein the second part identifies an address of the first device.

5. The method according to claim 1, wherein the first device is an intermediate node on a transmission path of the first packet, the destination address field further comprises a second part; and the method further comprises: before generating the second packet and the third packet, determining, by the first device, that the second part matches an address of the first device.

6. The method according to claim 1, wherein the first packet is a segment routing over internet protocol version 6 (SRv6) packet, the node information list is included in a segment routing header (SRH) of the SRv6 packet, and the node information list is a segment list of the SRH;

the first packet is an IPV6 packet, the node information list is included in a routing header (RH) of the IPV6 packet, and the node information list is a segment list of the RH; or the first packet is the IPV6 packet, the node information list is included in a destination options header (DOH) of the IPV6 packet, and the node information list is an address list of the DOH.

7. The method according to claim 1, wherein the first packet, the second packet, and the third packet each further comprises a first identifier that indicates a location of node information of a current packet processing device in the node information list.

8. The method according to claim 1, wherein the first packet further comprises a leaf identifier that indicates the first device is a leaf node; and the method further comprises: after obtaining the first packet, decapsulating, by the first device, the first packet based on the leaf identifier and the first part.

9. The method according to claim 8, wherein the node information list includes the leaf identifier.

10. The method according to claim 4, wherein the second part comprises a common prefix and a node identifier, the common prefix comprises a same part of node addresses in node information of packet processing devices, and the node identifier indicates a different part of the node addresses in the node information of the packet processing devices.

11. A packet transmission apparatus, comprising:

a processor; and a memory coupled to the processor and storing instructions, which when executed by the processor, cause the packet transmission apparatus to:

obtain a first packet comprising a destination address field and a node information list, wherein the node information list comprises node information of a second device and node information of a third device, and the destination address field comprises a first part;

determine the node information of the second device and the node information of the third device from the node information list based on the first part, wherein the first part identifies a location of the node information of the second device and a location of the node information of the third device in the node information list;

generate a second packet and a third packet based on the first packet, wherein the second packet comprises the node information of the second device, and the third packet comprises the node information of the third device; and send the second packet to the second device, and send the third packet to the third device.

12. The packet transmission apparatus according to claim 11, wherein the location of the node information of the second device in the node information list is a start location, and the location of the node information of the third device in the node information list is an end location; or the location of the node information of the second device in the node information list is a start location and the first part further identifies an offset of the location of the node information of the third device in the node information list relative to the location of the node information of the second device in the node information list.

13. The packet transmission apparatus according to claim 11, wherein the packet transmission apparatus to generate the second packet comprises the packet transmission apparatus to replicate the first packet based on the first part to obtain a fourth packet, and add the node information of the second device to the fourth packet to obtain the second packet.

14. The packet transmission apparatus according to claim 11, wherein the packet transmission apparatus is an ingress node on a transmission path of the first packet; and the packet transmission apparatus to obtain the first packet comprises the packet transmission apparatus to:

receive a fifth packet, and add the first part and a second part of the destination address field of the first packet to a destination address field of the fifth packet, to obtain the first packet, wherein the second part identifies an address of the packet transmission apparatus.

15. The packet transmission apparatus according to claim 11, wherein the packet transmission apparatus is an intermediate node on a transmission path of the first packet, the destination address field further comprises a second part; and before generating the second packet and the third packet, the packet transmission apparatus is further to: determine that the second part matches an address of the packet transmission apparatus.

16. The packet transmission apparatus according to claim 11, wherein the first packet is a segment routing over internet protocol version 6 (SRv6) packet, the node information list is included in a segment routing header (SRH) of the SRv6 packet, and the node information list is a segment list of the SRH;

the first packet is an IPV6 packet, the node information list is included in a routing header (RH) of the Ipv6 packet, and the node information list is a segment list of the RH; or the first packet is the Ipv6 packet, the node information list is included in a destination options header (DOH) of the Ipv6 packet, and the node information list is an address list of the DOH.

17. The packet transmission apparatus according to claim 11, wherein the first packet, the second packet, and the third packet each further comprises a first identifier that indicates a location of node information of a current packet processing device in the node information list.

18. The packet transmission apparatus according to claim 11, wherein the first packet further comprises a leaf identifier that indicates that the packet transmission apparatus is a leaf node; and after obtaining the first packet, the packet transmission apparatus is further to decapsulate the first packet based on the leaf identifier and the first part.

19. The packet transmission apparatus according to claim 18, wherein the node information list carries the leaf identifier.

20. The packet transmission apparatus according to claim 14, wherein the second part comprises a common prefix and a node identifier, the common prefix comprises a same part of node addresses in node information of packet processing devices, and the node identifier indicates a different part of the node addresses in the node information of the packet processing devices.

* * * * *